(12) United States Patent
Bjorklund et al.

(10) Patent No.: US 10,994,240 B2
(45) Date of Patent: May 4, 2021

(54) REMOTE MONITORING OF PRESSURE SWING ADSORPTION UNITS

(71) Applicant: UOP LLC, Des Plaines, IL (US)

(72) Inventors: Chad E. Bjorklund, Schaumburg, IL (US); Stephen Kelley, Chicago, IL (US); Jeffrey Guenther, Arlington Heights, IL (US); Ryan McCool, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 269 days.

(21) Appl. No.: 16/133,623

(22) Filed: Sep. 17, 2018

(65) Prior Publication Data

US 2019/0083920 A1 Mar. 21, 2019

Related U.S. Application Data

(60) Provisional application No. 62/560,014, filed on Sep. 18, 2017.

(51) Int. Cl.
*B01D 53/047* (2006.01)
*B01D 53/04* (2006.01)
*B01D 53/30* (2006.01)

(52) U.S. Cl.
CPC ....... *B01D 53/047* (2013.01); *B01D 53/0446* (2013.01); *B01D 53/30* (2013.01);
(Continued)

(58) Field of Classification Search
CPC .................. B01D 53/047; B01D 2259/40009
See application file for complete search history.

(56) References Cited

U.S. PATENT DOCUMENTS 4,380,146 A 4/1983 Yannone ............... 60/39.281
4,775,460 A 10/1988 Reno
(Continued)

FOREIGN PATENT DOCUMENTS

EP 2 746 884 A1 6/2014
EP 2746884 A1 6/2014
(Continued)

OTHER PUBLICATIONS

Oct. 25, 2018—(PCT) Notification of Receipt of Search Copy—App PCT/US2018/051532.
(Continued)

*Primary Examiner* — Renee Robinson

(57) ABSTRACT

A piece of equipment commonly used in many petrochemical and refinery processes is a pressure swing adsorption (PSA) unit. A PSA unit may be used to recover and purify hydrogen process streams, such as from hydrocracking and hydrotreating process streams. Aspects of the present disclosure are directed to monitoring PSA unit processes for potential and existing issues, providing alerts, and/or adjusting operating conditions to optimize PSA unit life. There are many process performance indicators that may be monitored including, but not limited to, flow rates, chemical analyzers, temperature, and/or pressure. In addition, valve operation may be monitored, including opening speed, closing speed, and performance. The system may adjust one or more operating characteristics to decrease the difference between the actual operating performance in the recent and the optimal operating performance.

17 Claims, 24 Drawing Sheets

(52) U.S. Cl.
CPC ...... *B01D 53/0423* (2013.01); *B01D 2256/16* (2013.01); *B01D 2256/18* (2013.01); *B01D 2259/40007* (2013.01); *B01D 2259/40009* (2013.01); *B01D 2259/40032* (2013.01); *B01D 2259/4062* (2013.01); *B01D 2259/40064* (2013.01); *B01D 2259/4067* (2013.01)

(56) References Cited

U.S. PATENT DOCUMENTS

| | | | |
|---|---|---|---|
| 4,795,545 A | 1/1989 | Schmidt | |
| 5,077,252 A | 12/1991 | Owen et al. | 502/43 |
| 5,605,435 A | 2/1997 | Haugen | 137/514 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,392,114 B1 | 5/2002 | Shields et al. | 582/719 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,644,192 B2 | 2/2014 | Budampati et al. | 370/255 |
| 8,811,231 B2 | 8/2014 | Budampati et al. | 370/255 |
| 8,923,882 B2 | 12/2014 | Gandhi et al. | 455/455 |
| 9,134,717 B2 | 9/2015 | Trnka | |
| 9,166,667 B2 | 10/2015 | Thanikachalam | |
| 9,176,498 B2 | 11/2015 | Baramov | |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0147351 A1 | 8/2003 | Greenlee | 370/232 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0204775 A1 | 10/2004 | Keyes | 705/30 |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0098033 A1 | 5/2005 | Mallavarapu et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0245286 A1 | 10/2009 | Kore et al. | 370/475 |
| 2009/0268674 A1 | 10/2009 | Liu et al. | 370/329 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0158764 A1 | 6/2010 | Hedrick | 422/134 |
| 2010/0230324 A1 | 9/2010 | Al-Alloush et al. | 208/82 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0079899 A1 | 3/2013 | Baramov | 700/32 |
| 2013/0090088 A1 | 4/2013 | Chevsky et al. | 455/411 |
| 2013/0094422 A1 | 4/2013 | Thanikachalam | 370/312 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0174288 A1* | 6/2014 | Arslan | G05B 23/0221 95/1 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2015/0059714 A1 | 3/2015 | Bernards | 123/568.11 |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | |
| 2015/0185716 A1 | 7/2015 | Wichmann et al. | 700/287 |
| 2015/0276208 A1 | 10/2015 | Maturana et al. | 700/274 |
| 2015/0330571 A1 | 11/2015 | Beuneken | 141/4 |
| 2016/0033941 A1 | 2/2016 | T et al. | 700/81 |
| 2016/0098037 A1 | 4/2016 | Zornio et al. | 700/20 |
| 2016/0147204 A1 | 5/2016 | Wichmann et al. | 700/287 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0284410 A1 | 10/2017 | Sharpe, Jr. | |

(56) References Cited

U.S. PATENT DOCUMENTS

| | | |
|---|---|---|
| 2017/0315543 A1 | 11/2017 | Horn et al. |
| 2017/0323038 A1 | 11/2017 | Horn et al. |
| 2017/0352899 A1 | 12/2017 | Asai |
| 2018/0046155 A1 | 2/2018 | Horn et al. |
| 2018/0081344 A1 | 3/2018 | Romatier et al. |
| 2018/0082569 A1 | 3/2018 | Horn et al. |
| 2018/0121581 A1 | 5/2018 | Horn et al. |
| 2018/0122021 A1 | 5/2018 | Horn et al. |
| 2018/0155638 A1 | 6/2018 | Al-Ghamdi ............... 208/79 |
| 2018/0155642 A1 | 6/2018 | Al-Ghamdi et al. |
| 2018/0197350 A1 | 7/2018 | Kim |
| 2018/0275690 A1 | 9/2018 | Lattanzio et al. |
| 2018/0275691 A1 | 9/2018 | Lattanzio et al. |
| 2018/0275692 A1 | 9/2018 | Lattanzio et al. |
| 2018/0280914 A1 | 10/2018 | Victor et al. |
| 2018/0280917 A1 | 10/2018 | Victor et al. |
| 2018/0282633 A1 | 10/2018 | Van de Cotte et al. |
| 2018/0282634 A1 | 10/2018 | Van de Cotte et al. |
| 2018/0282635 A1 | 10/2018 | Van de Cotte et al. |
| 2018/0283368 A1 | 10/2018 | Van de Cotte et al. |
| 2018/0283392 A1 | 10/2018 | Van de Cotte et al. |
| 2018/0283404 A1 | 10/2018 | Van de Cotte et al. |
| 2018/0283811 A1 | 10/2018 | Victor et al. |
| 2018/0283812 A1 | 10/2018 | Victor et al. |
| 2018/0283813 A1 | 10/2018 | Victor et al. |
| 2018/0283815 A1 | 10/2018 | Victor et al. |
| 2018/0283816 A1 | 10/2018 | Victor et al. |
| 2018/0283818 A1 | 10/2018 | Victor et al. |
| 2018/0284705 A1 | 10/2018 | Van de Cotte et al. |
| 2018/0286141 A1 | 10/2018 | Van de Cotte et al. |
| 2018/0311609 A1 | 11/2018 | McCool et al. |
| 2018/0362862 A1 | 12/2018 | Gellaboina et al. |
| 2018/0363914 A1 | 12/2018 | Faiella et al. |
| 2018/0364747 A1 | 12/2018 | Charr et al. |
| 2019/0002318 A1 | 1/2019 | Thakkar et al. |
| 2019/0003978 A1 | 1/2019 | Shi et al. |
| 2019/0015806 A1 | 1/2019 | Gellaboina et al. |
| 2019/0041813 A1 | 2/2019 | Horn et al. |
| 2019/0083920 A1 | 3/2019 | Bjorklund et al. |
| 2019/0101336 A1 | 4/2019 | Victor et al. |
| 2019/0101342 A1 | 4/2019 | Victor et al. |
| 2019/0101907 A1 | 4/2019 | Charr et al. |
| 2019/0108454 A1 | 4/2019 | Banerjee et al. |
| 2019/0120810 A1 | 4/2019 | Kumar KN et al. |
| 2019/0151814 A1 | 5/2019 | Victor et al. |
| 2019/0155259 A1 | 5/2019 | Romatier et al. |

FOREIGN PATENT DOCUMENTS

| | | |
|---|---|---|
| EP | 2801937 | 11/2014 |
| WO | WO 2001/060951 | 8/2001 |
| WO | 2009046095 A1 | 4/2009 |
| WO | WO 2009/046095 | 4/2009 |
| WO | WO 2014/042508 | 3/2014 |
| WO | WO 2014/123993 | 8/2014 |
| WO | WO 2016/141128 | 9/2016 |

OTHER PUBLICATIONS

International Preliminary Report on Patentability for PCT/US2018/051532, dated Mar. 24, 2020.

WO App. PCT/US2018/051532: International Search Report and Written Opinion dated Dec. 13, 2018.

\* cited by examiner

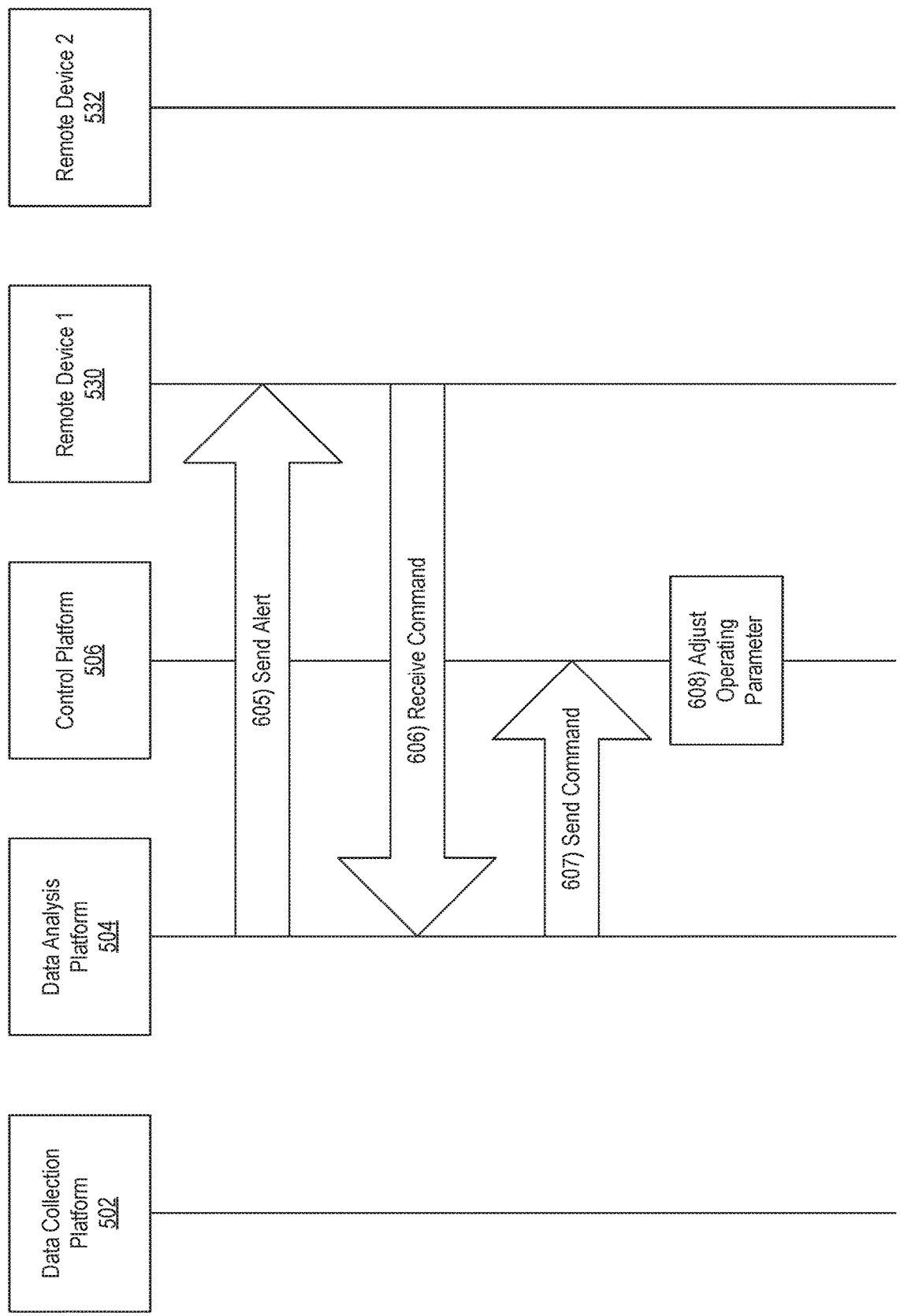

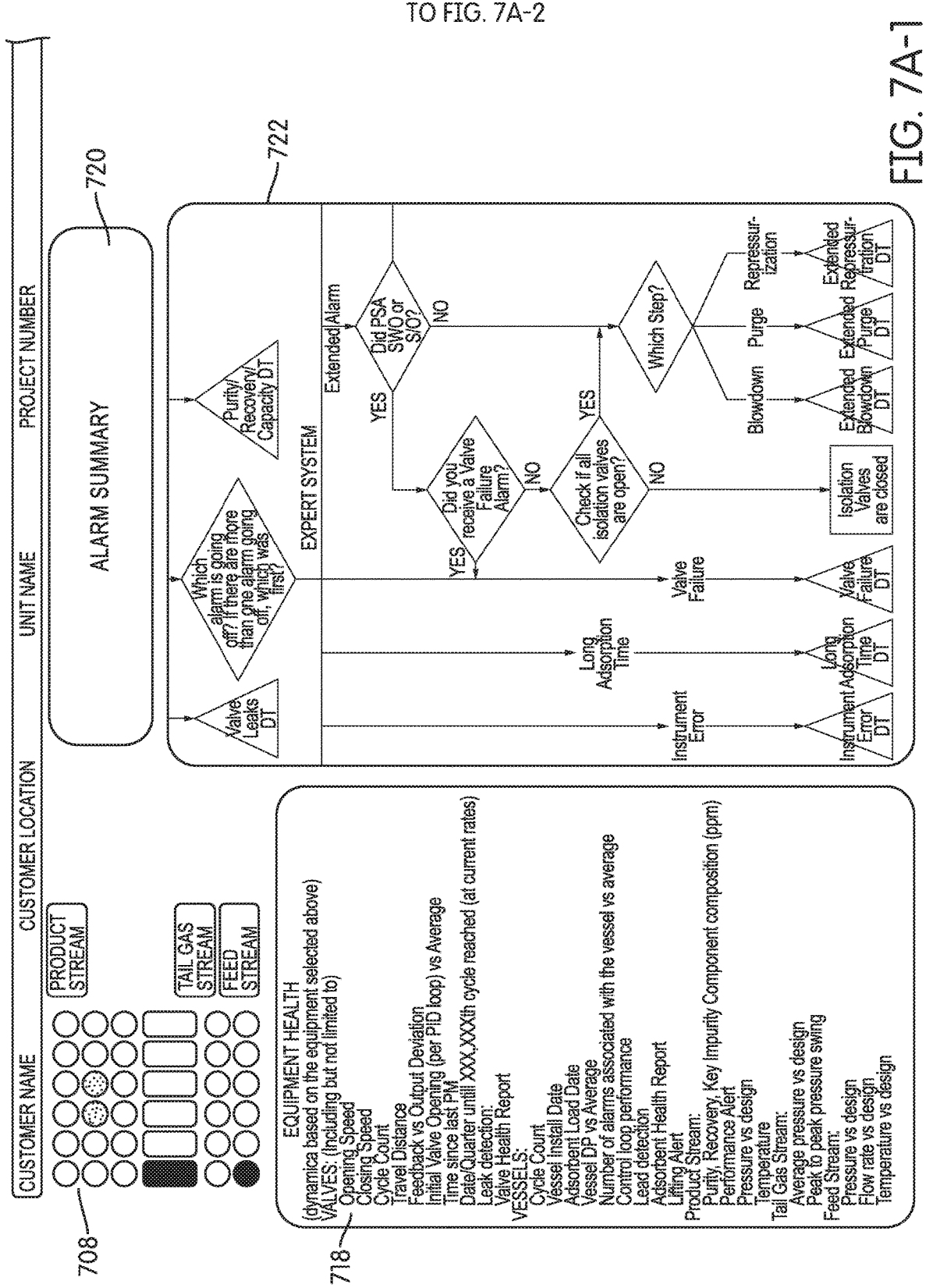

Equipment Health Display Information

- VALVES Information: (Including but not limited to)
    - Opening Stroke Time
    - Closing Stroke Time
    - Cycle Count
    - Travel Distance
    - Feedback vs Output Deviation
    - Initial Valve Opening (per PID loop) vs Average
    - Time since last PM
    - Date/Quarter until XXX,XXXth cycle reached (at current rates)
    - Leak detection
    - Valve Health Report

- Product Stream Information: (Including but not limited to)
    - Purity
    - Recovery
    - Key Impurity Component composition (% or ppm)
    - Performance Alert
    - Pressure vs design
    - Temperature

- VESSELS Information: (Including but not limited to)
    - Cycle Count
    - Vessel Install Date
    - Adsorbent Load Date
    - Vessel DP vs Average
    - Number of alarms associated with the vessel vs average
    - Control loop performance
    - Leak detection
    - Adsorbent Health Report
    - Lifting Alert

- Tail Gas Stream Information: (Including but not limited to)
    - Average pressure vs design
    - Peak to peak pressure swing
- Feed Stream:
    - Pressure vs Design
    - Flow rate vs design
    - Temperature vs design
    - Knockout Drum Level

FIG. 7B

REMOTE MONITORING OF PRESSURE SWING ADSORPTION UNITS

CROSS-REFERENCE TO RELATED APPLICATION

This application claims the benefit of priority under 35 U.S.C. § 119(e) to U.S. Provisional Application No. 62/560,014, filed Sep. 18, 2017, which is incorporated by reference.

FIELD

The disclosure relates generally to a method and system for managing the operation of a plant, such as a chemical plant or a petrochemical plant, a refinery, or equipment within a plant or refinery, and more particularly to a method for improving the performance of components that make up operations in a plant.

BACKGROUND

Industrial processes are typically implemented using large numbers of devices, such as pumps, valves, compressors, or other industrial equipment used to implement various aspects of the industrial processes. With these large numbers of devices, scheduled or responsive maintenance needs to be efficient in order to maintain overall efficiency of a plant.

SUMMARY

The following summary presents a simplified summary of certain features. The summary is not an extensive overview and is not intended to identify key or critical elements.

One or more embodiments may include a system comprising: one or more sensors configured to measure operating information for a PSA unit; a data collection platform; a data analysis platform; and/or a control platform. The data collection platform may include: one or more processors of the data collection platform; a communication interface in communication with the one or more sensors; and memory storing executable instructions that, when executed, cause the data collection platform to: receive sensor data from the one or more sensors; correlate the sensor data with metadata comprising time data; and transmit the sensor data. The data analysis platform may include: one or more processors of the data analysis platform; and memory storing executable instructions that, when executed, cause the data analysis platform to: receive the sensor data from the data collection platform; analyze the sensor data; transmit the sensor data and calculations to a dashboard; and based on the analyzed sensor data, send a command for an adjustment to an operating condition related to the PSA unit. The control platform may include: one or more processors of the control platform; and memory storing executable instructions that, when executed, cause the control platform to: receive the command for the adjustment to the operating condition related to the PSA unit; and adjust an element of the PSA unit based on the command for the adjustment to the operating condition.

In one or more embodiments, the memory of the data analysis platform stores instructions that, when executed, cause the data analysis platform to: based on the sensor data from the one or more sensors, identify a change in an operating condition of a valve of the PSA unit relative to a same operating condition of a different valve of the PSA unit; and send a command to change an operating parameter of the valve of the PSA unit.

In one or more embodiments, the memory of the data analysis platform stores instructions that, when executed, cause the data analysis platform to: based on the sensor data from the one or more sensors, identify a step change in an operating condition of a valve of the PSA unit relative to a historical operating condition of the valve of the PSA unit; and send a command to change an operating parameter of the valve of the PSA unit.

In one or more embodiments, the memory of the data analysis platform stores instructions that, when executed, cause the data analysis platform to: based on the sensor data from the one or more sensors, predict a remaining life of a valve of the PSA unit; and based on the predicted remaining life of the valve of the PSA unit, generate a recommendation for a maintenance to be performed on the valve of the PSA unit.

In one or more embodiments, the memory of the data analysis platform stores instructions that, when executed, cause the data analysis platform to: perform heuristic analysis on the sensor data from the one or more sensors to determine a recommendation for a maintenance to be performed on the PSA unit.

In one or more embodiments, the memory of the data analysis platform stores instructions that, when executed, cause the data analysis platform to: use the sensor data from the one or more sensors to predict an upcoming maintenance requirement for the PSA unit.

In one or more embodiments, the memory of the data analysis platform stores instructions that, when executed, cause the data analysis platform to: use the sensor data from the one or more sensors to monitor equipment health of the PSA unit.

One or more embodiments may include one or more non-transitory computer-readable media storing instructions that, when executed by one or more processors, cause a system to: receive sensor data from one or more sensors configured to measure operating information for a PSA unit; correlate the sensor data with metadata comprising time data; analyze the sensor data; transmit the sensor data and calculations to a dashboard; and based on the analyzed sensor data, send a command for an adjustment to an operating condition related to the PSA unit.

One or more embodiments may include a method comprising: receiving, by a data analysis computing device, sensor data for a sensor associated with a PSA unit; based on analyzing the sensor data, determining a current operating condition for an element of the PSA unit; determining a difference between the current operating condition for the element of the PSA unit and an optimal operating condition for the element of the PSA unit; displaying the difference between the current operating condition and the optimal operating condition on a dashboard outlining recommendations for adjustments to the element of the PSA unit; based on the analyzed sensor data, determining a command for adjusting the element of the PSA unit to reduce the difference between the current operating condition and the optimal operating condition; and sending the command for adjusting the element of the PSA unit.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which:

FIGS. 6A-6B depict an illustrative flow diagram of one or more steps that one or more devices may perform in controlling one or more aspects of a plant operation in accordance with one or more example embodiments;

FIG. 7B depicts an equipment health display information portion of a dashboard for viewing information and/or taking actions related to one or more aspects of a plant operation in accordance with one or more example embodiments.

DETAILED DESCRIPTION

Figure 1:
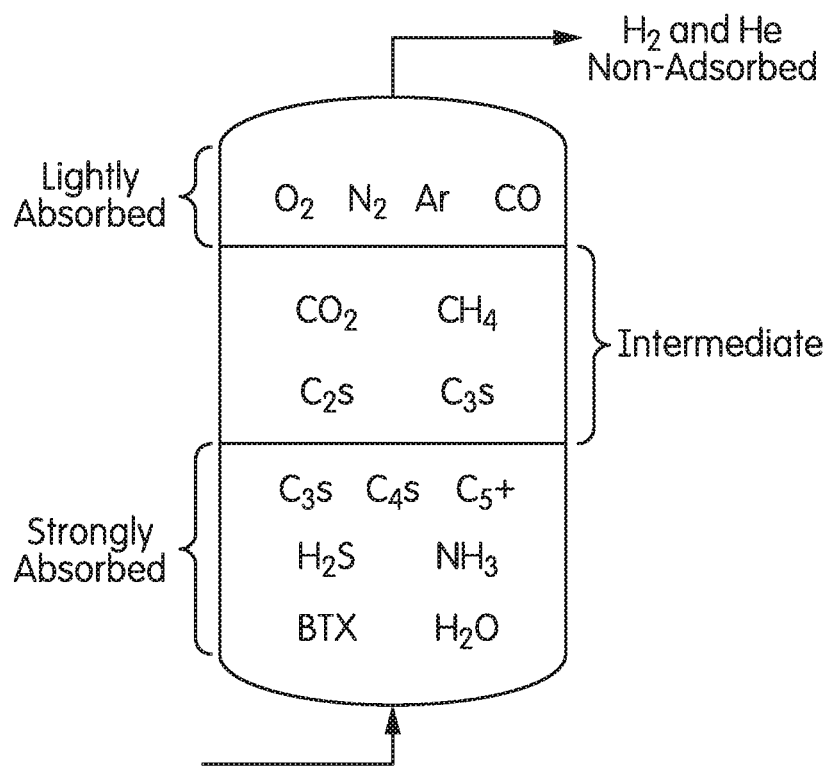
FIG. 1 depicts a schematic of an adsorption vessel for a pressure swing adsorption unit in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Further, various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

A piece of equipment commonly used in many petrochemical and refinery processes is a pressure swing adsorption (PSA) unit. Adsorption is the preferential partitioning of substances from the gaseous or liquid phase onto the surface of a solid substrate (adsorbent). Most PSA units are used to recover and purify hydrogen process streams such as from hydrocracking and hydrotreating process streams. But PSA units can also be used to recover and purify helium, methane, monomer, chlorine, and carbon dioxide. Most hydrogen PSA unit applications are used for steam methane reformers, refinery off-gas (Platforming, HC, etc.), and ethylene off-gas. PSA units may accept feeds with purities from about 35% up to 99% and may be designed for a very wide range of product rates.

A typical PSA unit may have a control system containing hardware, software, and human-machine interface for operator interface, and a valve skid containing control valves, piping, and instrumentation. The devices in the valve skid communicate with the control system to operate the PSA. The PSA unit also contains multiple adsorber vessels and a tail gas surge tank. The adsorber vessels contain adsorbents.

There may be any number of adsorber vessels depending on the plant design, for example at least 3 and up to 20 adsorber vessels, often referred to as beds—e.g., a 6 bed polybed PSA unit or a 10 bed polybed PSA unit. Parameters that are monitored include feed flow, feed pressure, feed capacity, recovery, and purity. Loading refers to the quantity of adsorbed material per mass unit of adsorbent.

FIG. 1 represents flow through an adsorber during adsorption. The feed gas is introduced into the bottom of the adsorber vessel and contacts the adsorbent. Impurities are removed down to any level required. Heavy components as those that are strongly adsorbed ($C_4+$, $H_2S$, $NH_3$, BTX and H2O) are removed in the bottom portion of the bed (with a weak adsorbent). Intermediate components, such as CO, $CH_4$, $CO_2$, $C_2$s, and $C_3$s, are removed in the middle of the bed. Light components are more difficult to adsorb (e.g., require a very strong adsorbent). Examples are: $O_2$, Ar, and $N_2$. These components are removed at the top of the bed, and the separation is keyed on the lightest (or most difficult to adsorb) component. H2 and He are essentially non-adsorbed.

Figure 2:
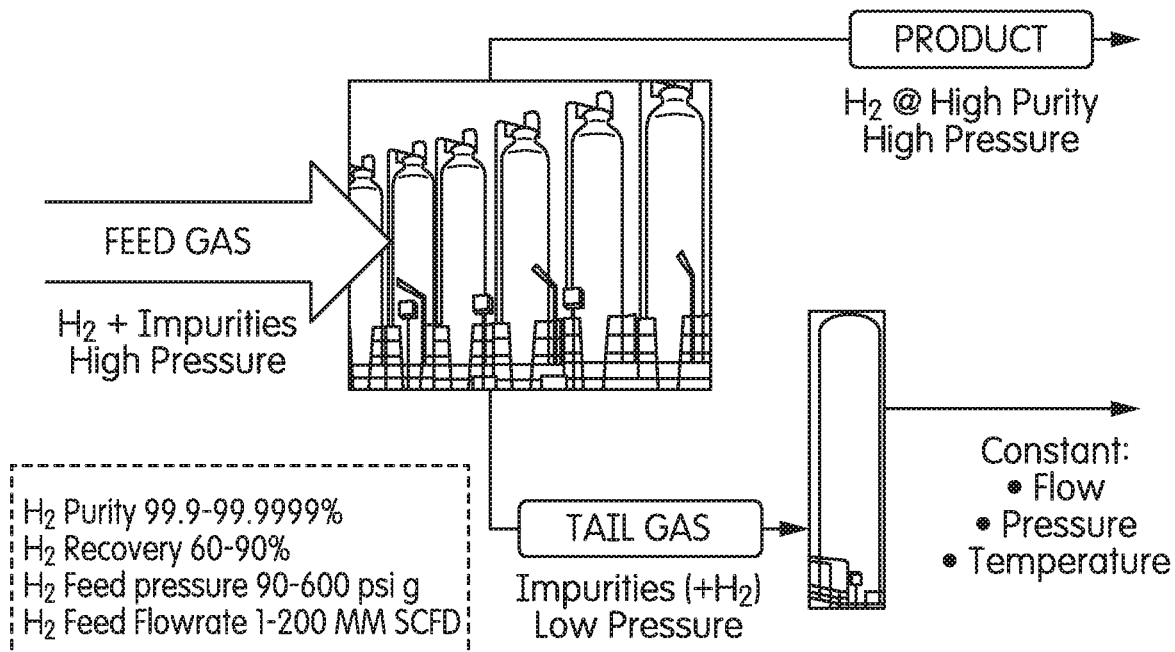
FIG. 2 depicts an illustrative pressure swing adsorption unit for a hydrogen purification process in accordance with one or more example embodiments.

The PSA unit relies on a pressure swing cycle and the ability of adsorbents to adsorb more impurities at high pressure than at low pressure. FIG. 2 depicts a PSA basic flow diagram. Feed enters at high pressure, constant flow rate, constant pressure, and constant temperature. Product (e.g., high purity $H_2$) leaves at high pressure, constant flow rate, constant pressure, and constant temperature. In time, the adsorbent becomes saturated with impurities and the impurities must be removed.

Hydrogen recovery (%) is the quantity of hydrogen in the product stream divided by the quantity of hydrogen in the feed stream. Generally, the higher the number of adsorber units, the greater the percentage of hydrogen recovery. Recovery is maximized through pressure equalizations.

Figure 3A:
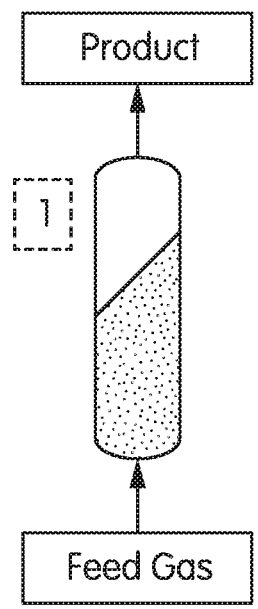
FIG. 3A-3E each depict steps of operation of a pressure swing adsorption unit for a hydrogen purification process in accordance with one or more example embodiments.
Figure 3B:
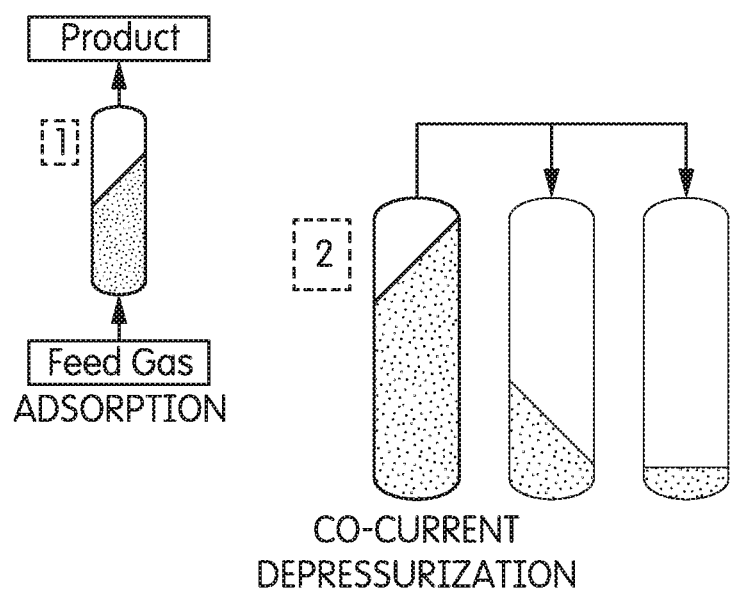
Figure 3C:
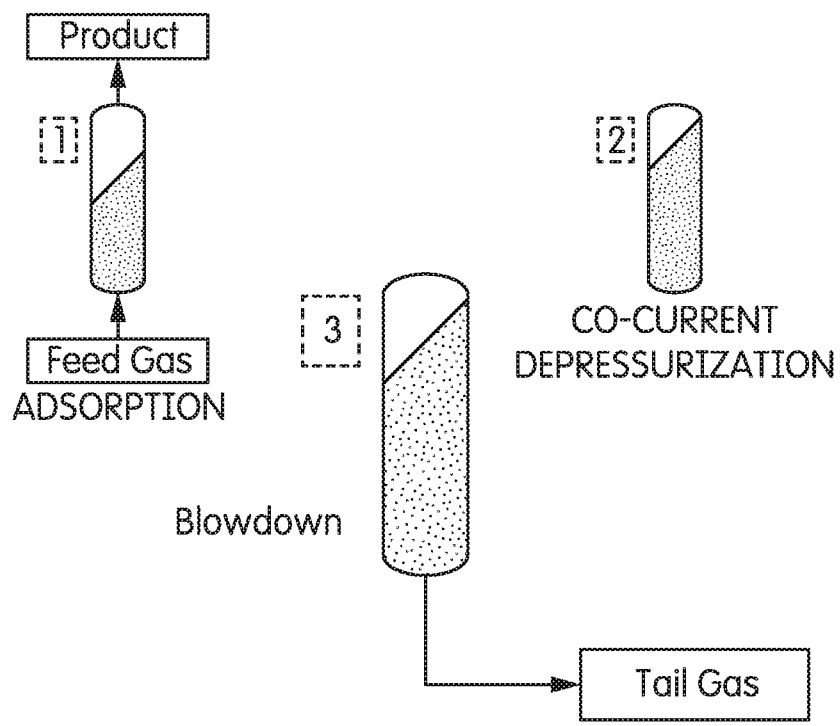
Figure 3D:
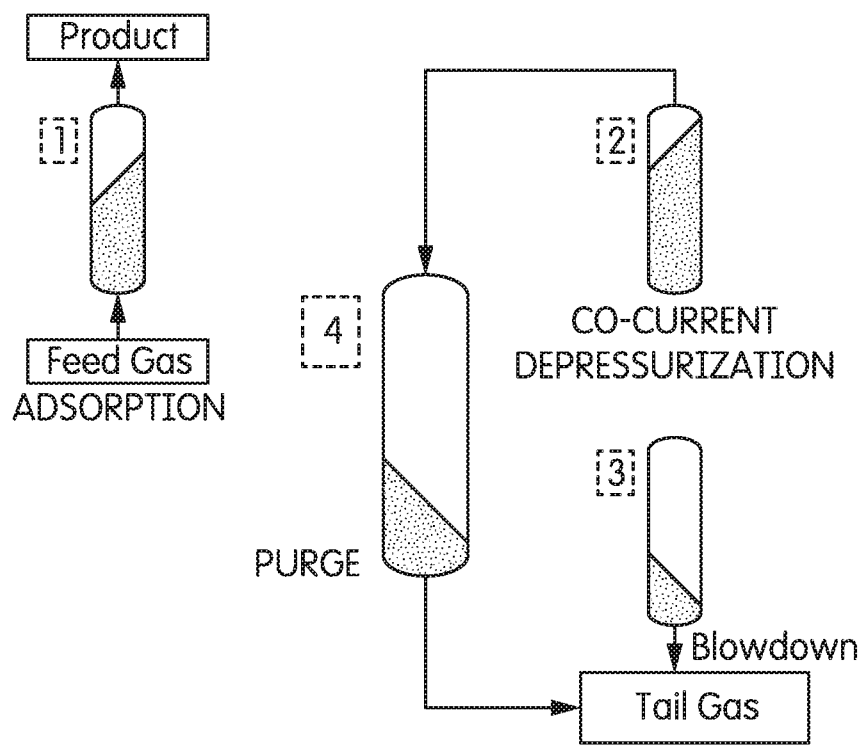
Figure 3E:
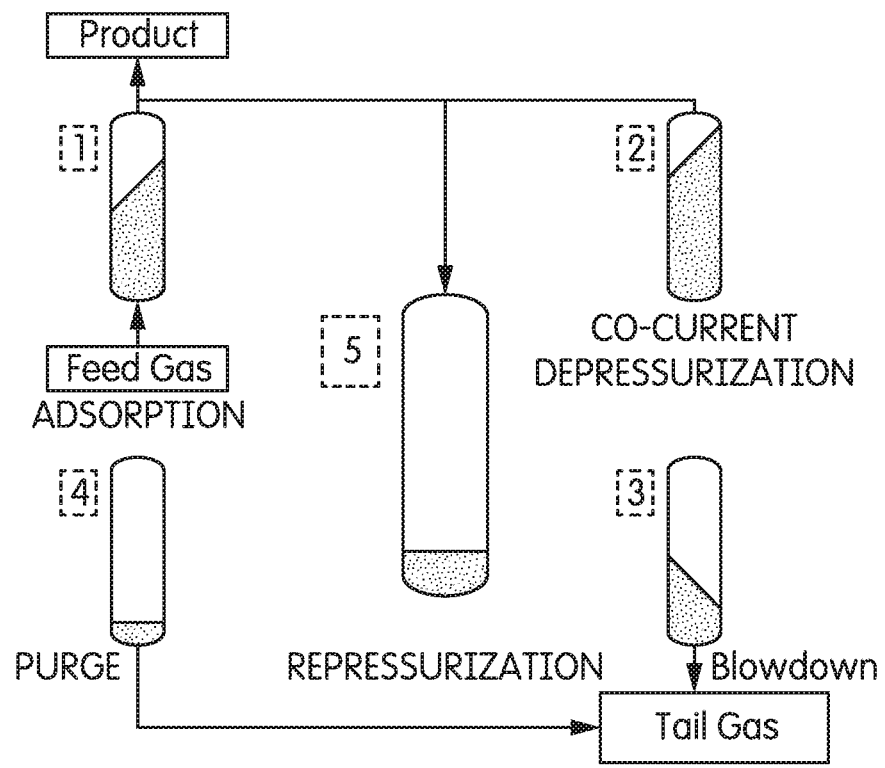
Figure 3F:
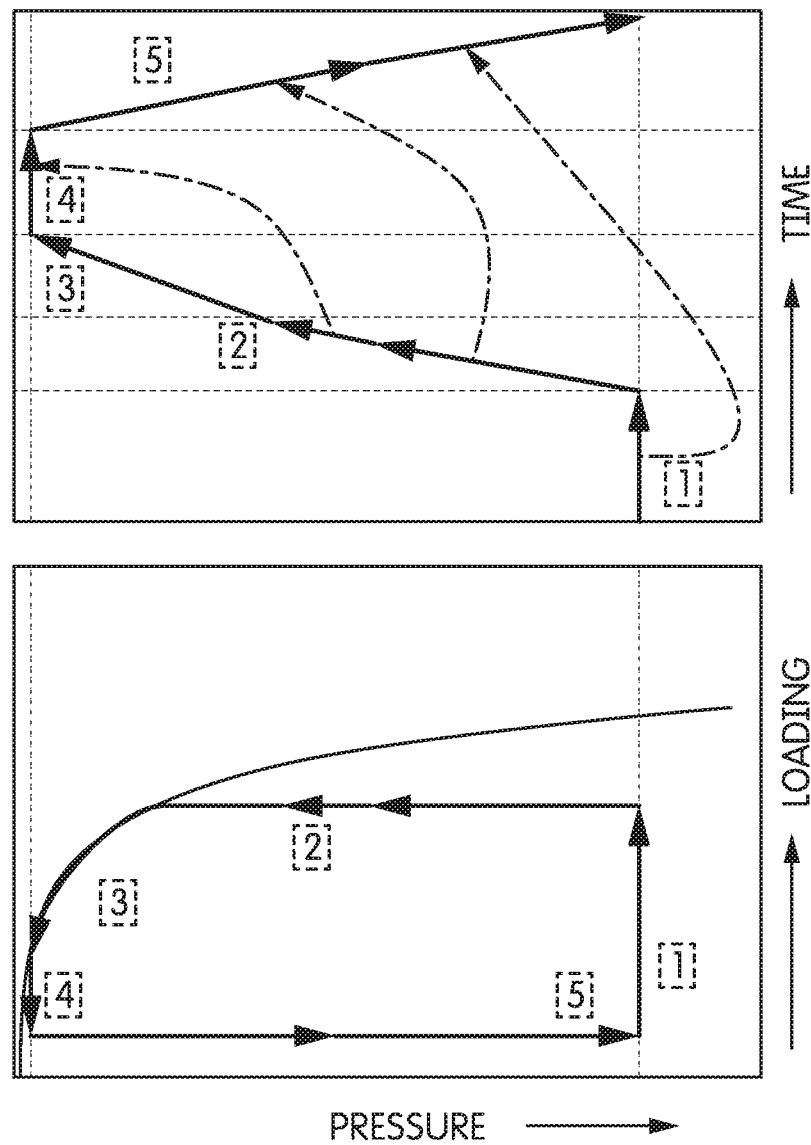
FIG. 3F depicts the pressure of each step over time.

FIGS. 3A-3E depict steps in a typical PSA process and FIG. 3F depicts pressure and loading over time for each step. Steps 1 to 5 (adsorption, co-current depressurization, counter-current depressurization, purge, re-pressurization) are indicated in boxes having the corresponding numbers in FIGS. 3A-3F. As shown in FIG. 3A, step 1, feed gas flows through an adsorber whereby impurities are adsorbed onto the adsorbent and product exits at the top. This is also shown in FIG. 2, described above. As seen in FIG. 3F, pressure increases as loading increases in the adsorber vessel. Once the adsorbent is saturated with impurities, adsorption step is discontinued. As shown in FIG. 3B, step 2, and FIG. 3F, pressure is equalized by passing the hydrogen stream over to one or more adsorber vessels via co-current depressurization and purging of the adsorber vessel. As shown in FIG. 3C and FIG. 3F, step 3, pressure is decreased in the adsorber vessel via counter-current depressurization or blowdown. This step removes the impurities from the adsorber unit. As shown in FIG. 3D and FIG. 3F, step 4, the adsorber vessel is purged using co-current depressurization with another adsorber vessel. The product from the blow down of step 3 and the purge of step 4 is tail gas that may be sent to a burner. As shown in FIG. 3E and FIG. 3F, step 5, the adsorber vessel is repressurized.

The off-gas or tail-gas stream from a PSA operates at varying flow and composition; hence a surge tank is utilized to dampen flow fluctuations caused by the cyclic nature of the process and provide mixing. Ideally, the resulting tail-gas stream is a constant flow, pressure, temperature off-gas, usually at low pressure. But the cyclic and batch nature of the process causes inherent swings in pressure and flowrate. The feed gas and hydrogen product stream operate at nearly the same pressure. The impurities and some unrecovered hydrogen are rejected at low pressure. The pressure of the tail gas generally has a strong impact on the efficiency of the PSA unit, and hence should be monitored.

An impurity level signal is used to adjust the operation of the PSA unit for optimum recovery, product purity, and maximum capacity. In some embodiments, the system may use a closed loop option. The system may maintain product purity by taking automatic corrective action to the unit's operation before significant levels of impurities can break through into the product gas (feed forward control). For each cycle, a self-tuning function monitors and adjusts the initial opening values of certain valves (PP, BD, Rep) to maintain the most efficient operation. The self-tuning function can adjust for positioner drift, changes in the flow characteristic from the vessels, etc.

The PSA unit can be designed to automatically pressurize each vessel for start-up. Auto pressure start-up helps ensure the smoothest possible start-up with the least operator intervention by automatically ramping each adsorber to the appropriate start-up pressure. Included in automatic capacity control is automatic tail gas flow adjustment to minimize fluctuations in tail gas flow and pressure.

A major advantage of a PSA unit is that it can produce very high purity hydrogen, typical total impurity levels in the product are between 1000 and 10 ppm, or even lower impurity levels. But the process must be carefully monitored in order to achieve and maintain such purity levels.

The process of adsorption and desorption occurs quite rapidly, e.g., every 90 seconds. Hence the pressure in each adsorber vessel increases and decreases rapidly and the valves used in the process must cycle on and off continuously and quickly. As many adsorber vessels may be used in a PSA unit, many valves are utilized in the process. It is critical that such valves operate in an efficient manner. The valves control the drastic changes in pressure that occurs in each adsorber vessel. Each adsorber vessel utilizes three to six valves, for example. Each valve may cycle, for example, 100,000 to 200,000 cycles per year. Thus the process is very abusive on the valves. The specialized valves contain soft seats that break down over time and need to be replaced or rebuilt. Sometimes the valves will stick open or closed resulting in a significant rock to the system.

Often the process will be operated until one or more valves fail (e.g., the valve didn't open or close, or took so long to open or close that the system determined that the valve failed), at which point the affected beds need to be taken offline at an inopportune time in the process. The system may take a pair of beds out of operation—for example, if it is a 10-bed unit, it then runs in 8-bed mode. When the system automatically takes a valve out, it has a potential for shutdown because it is a rough process to take a valve out of operation. Additionally, the plant operators have to scramble to get the valve fixed as soon as possible to return to operating in normal mode. This is not efficient and can be expensive and wasteful.

Alternatively, a data analysis platform may anticipate when valves may break down and take an adsorber offline during an optimal transition time in a cycle. Specifically, by detecting and predicting valve issues ahead of time, the data analysis platform may give warning to do maintenance on the valve in the future. The maintenance can be planned for, the valve vendor can be notified, a replacement valve can be ordered and prepared. Then, when the parts and maintenance workers are ready, and the process is at an appropriate stopping point, the maintenance can be quickly performed (e.g., in 30 minutes instead of five hours or two days), depending on the site and its resources. This allows a smooth transition to another adsorbent vessel.

In one or more embodiments, the PSA adsorbent fully regenerates each cycle, but mis-operation can lead to permanent deactivation. Deactivation will reduce the unit capacity and might not allow for the desired hydrogen purity to be reached.

The present disclosure is directed to providing advance notice for replacing key materials like catalyst or adsorbents or equipment such as valves. Sensors may be used to retrieve and transmit data, and the system may be configured to take one or more actions, such as sending one or more alerts or sounding one or more alarms if certain conditions are met. Additionally, this disclosure is directed to compiling and analyzing operational performance data and efficiently presenting this data (e.g., to a user) with expert recommendations to improve system operations and efficiency.

Figures 1, 4A:
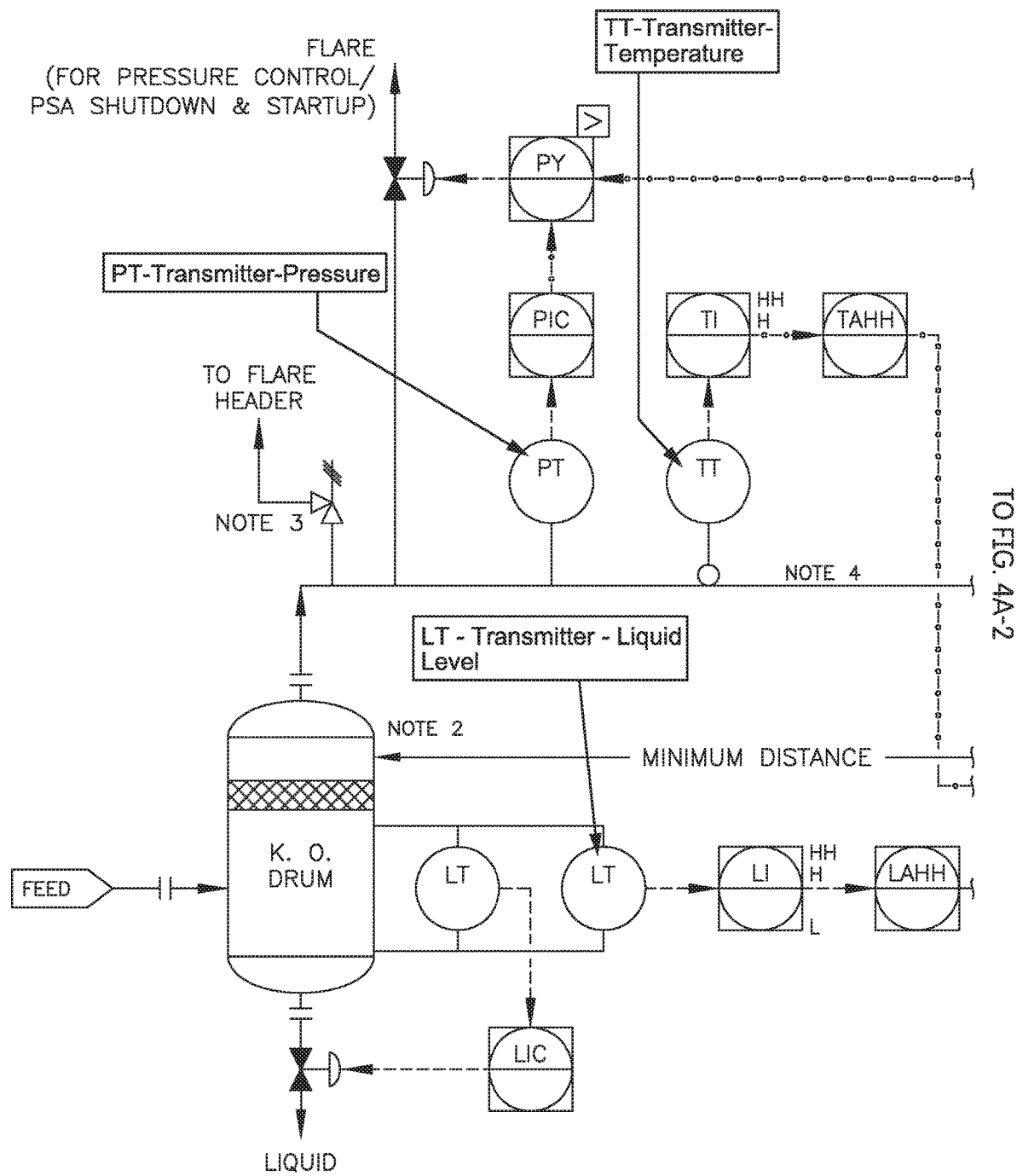
FIGS. 4A (4A-1 through 4A-3), 4B (4B-1 through 4B-5), and 4C depict positions of various sensors and transmitters in a pressure swing adsorption unit in accordance with one or more example embodiments.
Figures 2, 4A:
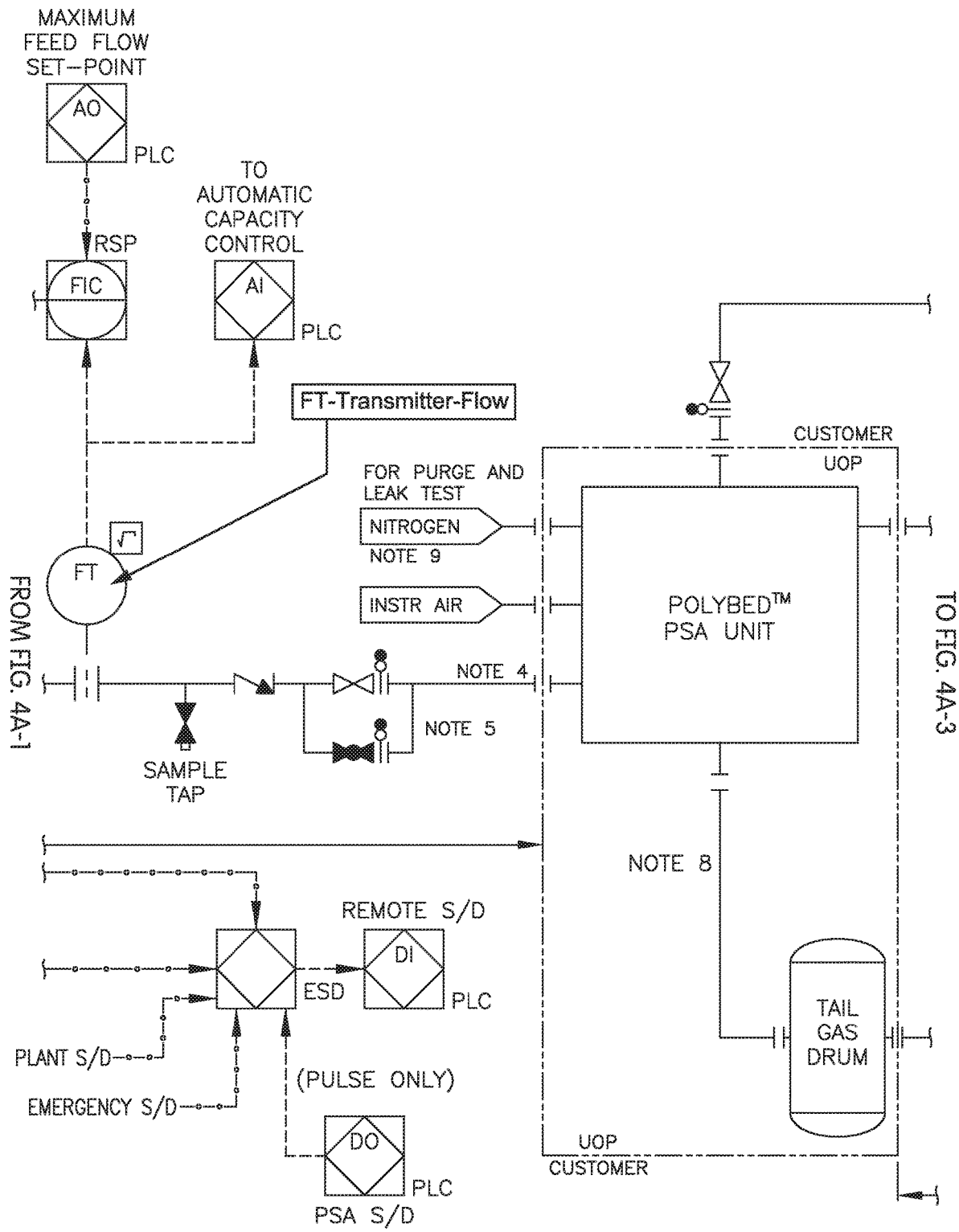
Figures 3, 4A:
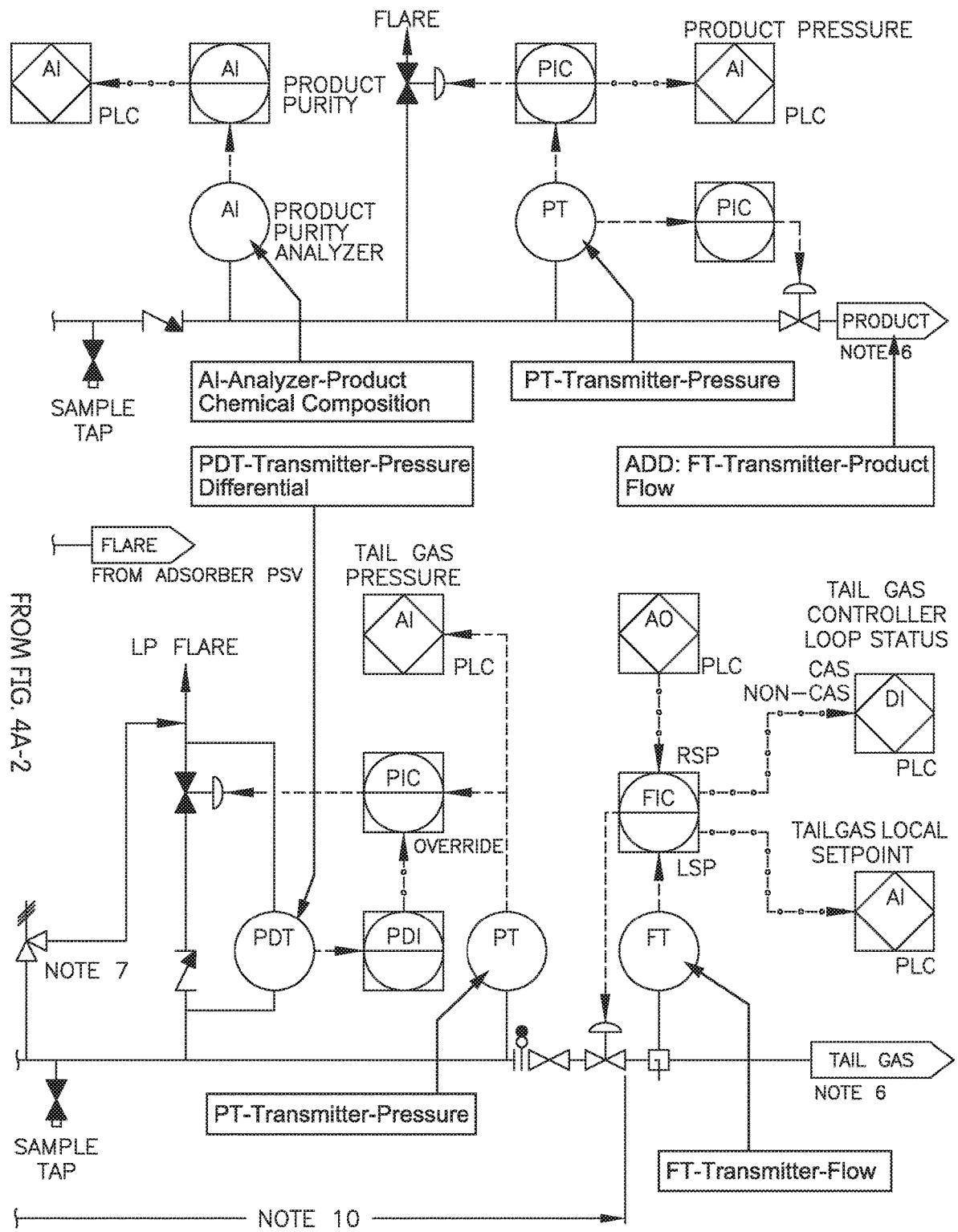
Figures 1, 4B:
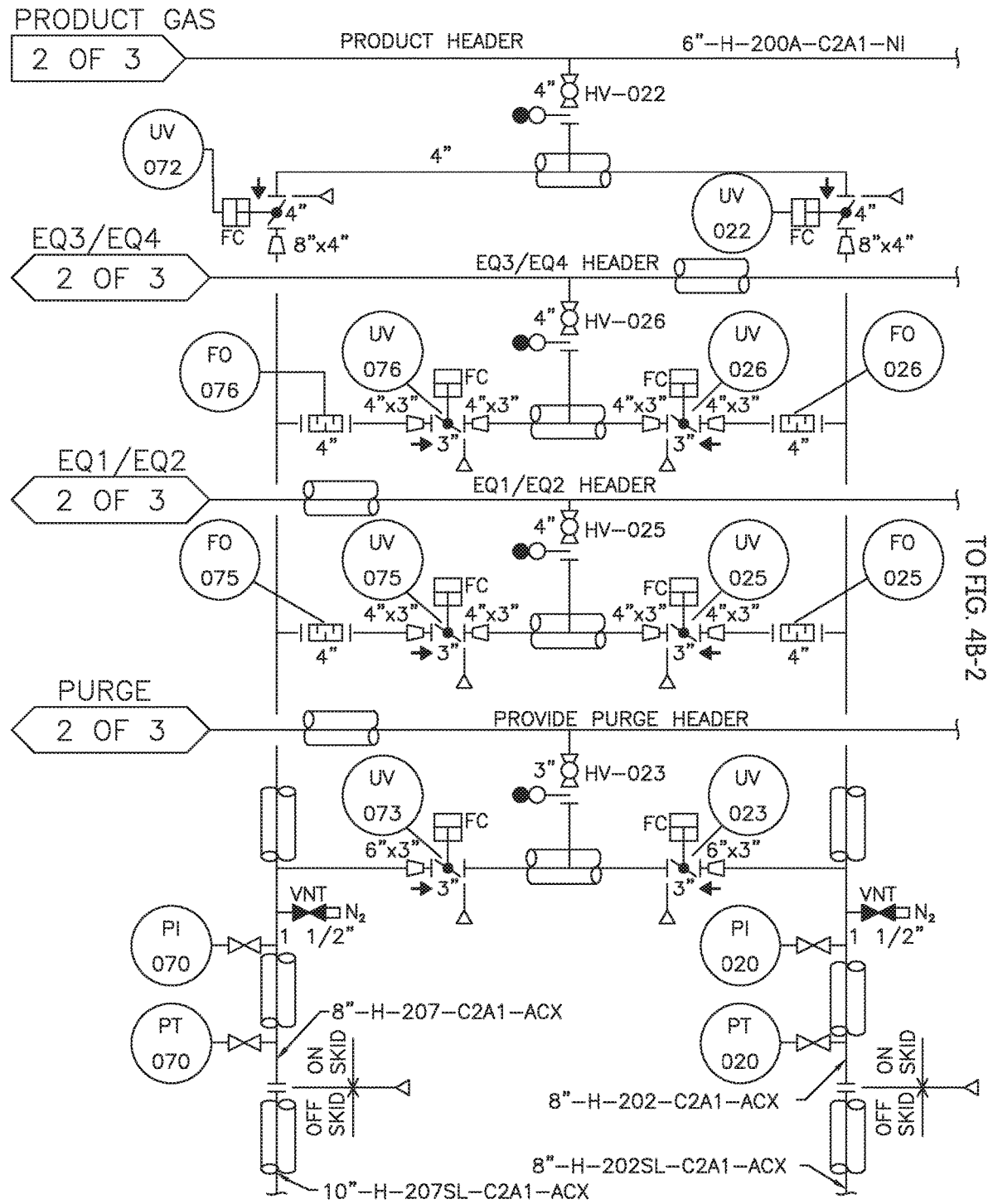
Figures 2, 4B:
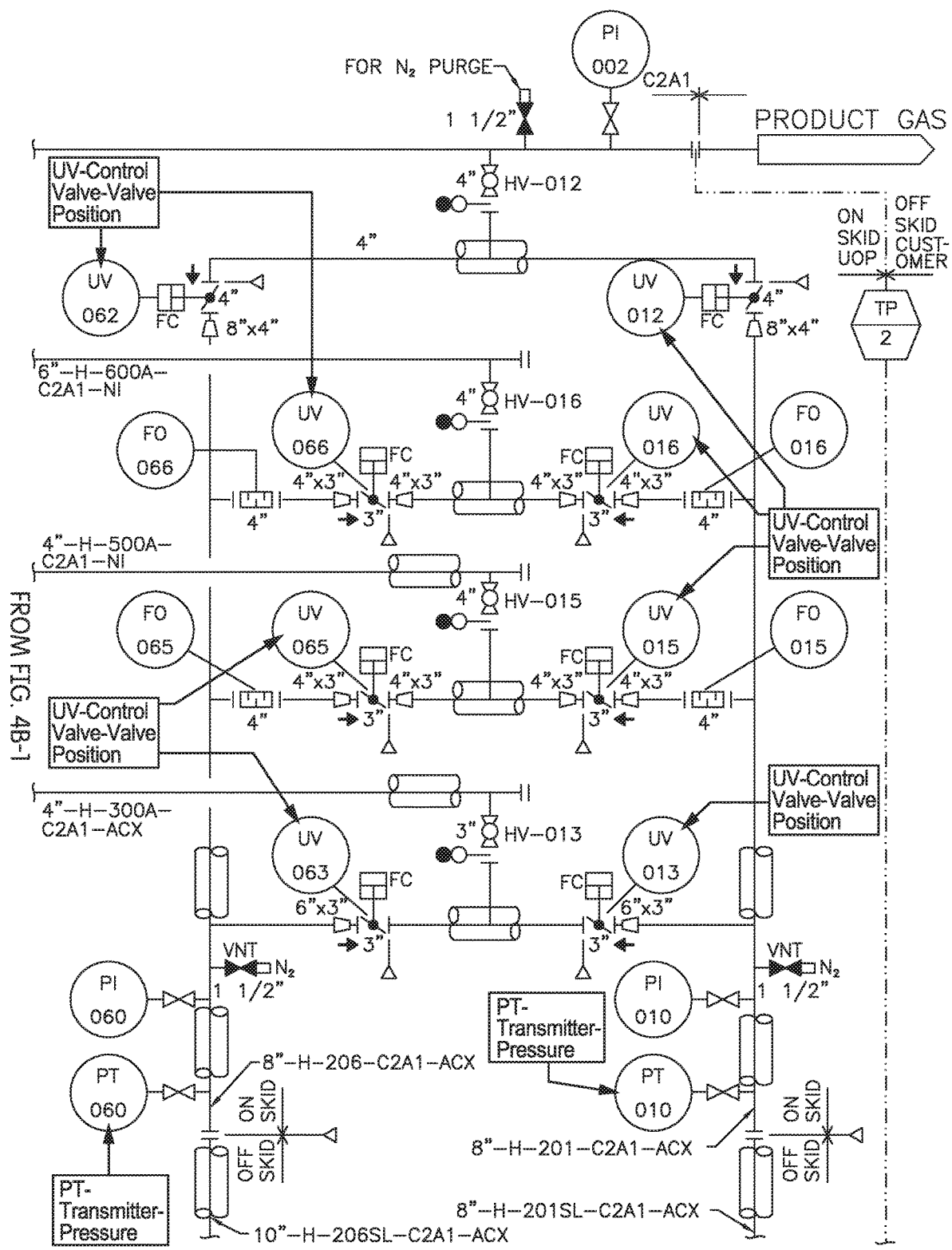
Figures 3, 4B:
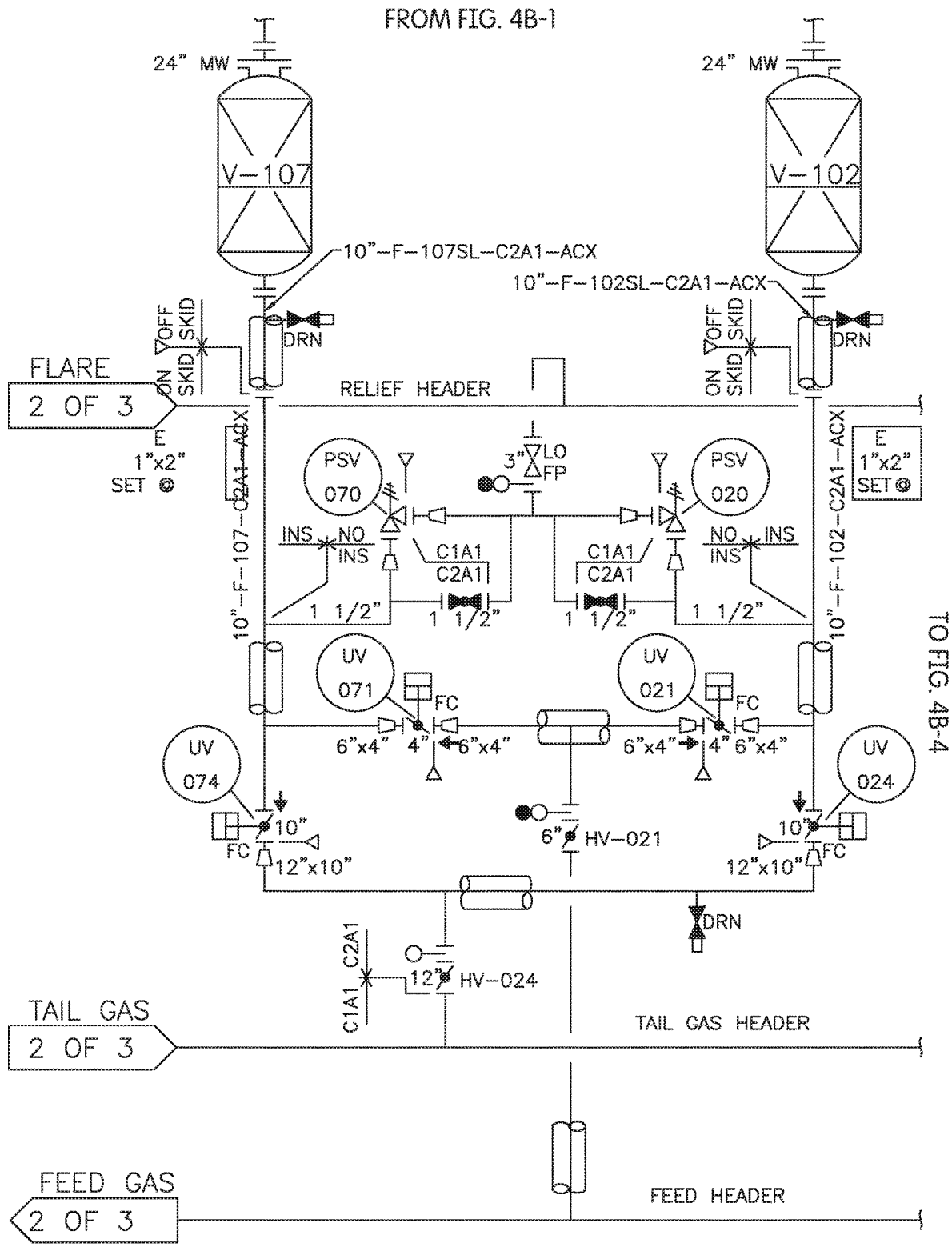
Figures 4, 4B:
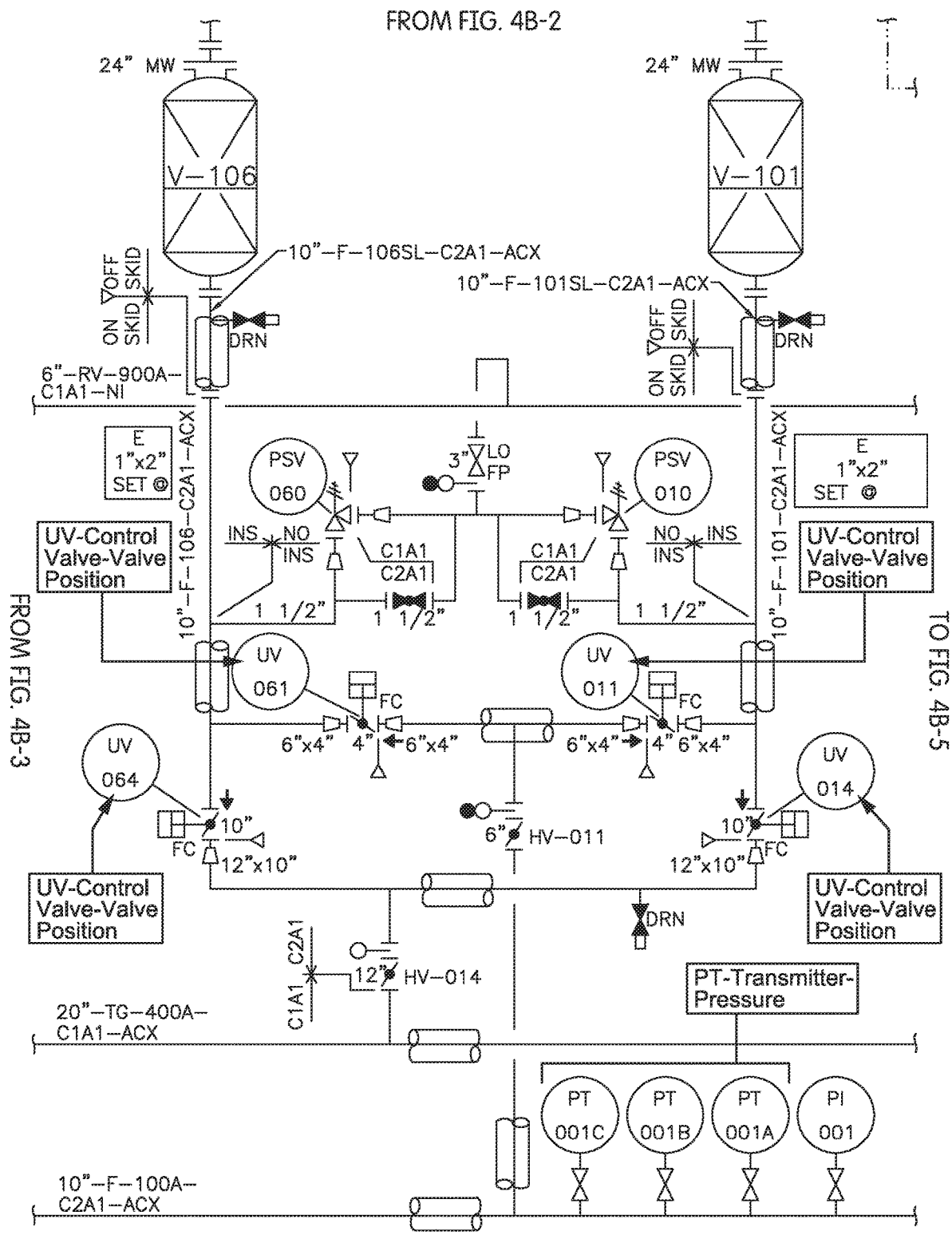

Suitable sensors include pressure sensors, temperature sensors, flow sensors for feed and product streams, chemical composition analyzers, and liquid level sensors are position throughout the PSA unit, as seen in FIG. 4A. In addition, control valves and valve position sensors may be positioned in the PSA unit, as seen in FIG. 4B. Other sensors may be used, such as moisture sensors/analyzers, infrared cameras, and tunable laser diodes.

In some embodiments, the system may include analyzers on the Feed, Product, and/or Tail Gas lines in order to feed composition data into an analytics engine (e.g., a data analysis platform). Some embodiments may include component-monitoring equipment, such as spectroscopy or gas chromatographs, to monitor the composition of each of the feed, product, and/or tail gas streams. The component-monitoring equipment may enable accurate and timely composition data into the analytics engine, which may increase the accuracy of the analytics calculation. One or more additional metrics and features may also be included.

Sensor Data Collection and Processing

In some plants, an operational objective may be to improve PSA unit operation on an ongoing and consistent basis. Therefore, a system may deliver timely and/or regular reports indicating current performance, along with interpretation and consulting on what actions may be performed to improve PSA unit performance.

Some plants routinely require technical support in the operation of the plant. Many of these plant operators perform little to no past/present/future analysis on the operation of their plant. This disclosure may solve both of those problems by analyzing plant data and incorporating algorithms and rules to proactively manage the plant and provide advance notice for replacing materials like catalyst, adsorbents, or equipment.

The disclosure ties together plant information with big data and analytics. The disclosure may also empower review of real plant data, which may allow for more accurate fault models based on, e.g., catalyst adsorbent materials. Ultimately, the disclosure may result in a more robust product tailored for a specific plant. The advantages that can be achieved are numerous and rooted in both new product development and optimization of plants.

The present disclosure incorporates technical service know-how and utilizes automated rules rather than engineers reviewing data. The present disclosure provides assurance that unit is operating at optimum purity/recovery while protecting adsorbent load, including capacity/purity monitoring; unit on-stream percentage; switchover history/time in each mode; process alarm tracking and diagnostics; dashboard links to electronic operating manual. The present disclosure also provides maximizing on stream time by recording, identifying, and scheduling maintenance activities, including valve cycle count and time since last maintenance; identifying suspected leaking valves; advanced valve diagnostics (open/close speed, overshoot, etc.); vessel cycle count; spare parts information/ordering support; control panel software updates. The present disclosure also provides quick resolution of unplanned downtime, including Technical Service group having access to internal dashboard for each plant, including access to preconfigured trends, displays, and historical data—no data exchange needed.

The system may include one or more computing devices or platforms for collecting, storing, processing, and analyzing data from one or more sensors. FIG. 5A depicts an illustrative computing system that may be implemented at one or more components, pieces of equipment (e.g., PSA units), and/or plants. FIG. 5A-FIG. 5E (hereinafter collectively "FIG. 5"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 5A depicts an illustrative operating environment in which various aspects of the present disclosure may be implemented in accordance with example embodiments. The computing system environment 500 illustrated in FIG. 5A is only one example of a suitable computing environment and is not intended to suggest any limitation as to the scope of use or functionality contained in the disclosure. The computing system environment 500 may include various sensor, measurement, and data capture systems, a data collection platform 502, a data analysis platform 504, a control platform 506, a client portal 512, one or more networks, one or more remote devices, and/or one or more other elements. The numerous elements of the computing system environment of FIG. 5A may be communicatively coupled through one or more networks. For example, the numerous platforms, devices, sensors, and/or components of the computing system environment 500 may be communicatively coupled through a private network 508. The sensors may be positioned on various components in the plant and may communicate wirelessly or wired with one or more platforms illustrated in FIG. 5A. The private network 508 may comprise, in some examples, a network firewall device to prevent unauthorized access to the data and devices on the private network 508. Alternatively, the private network 508 may be isolated from external access through physical means, such as a hard-wired network with no external, direct-access point. The data communicated on the private network 508 may be optionally encrypted for further security. Depending on the frequency of collection and transmission of sensor measurements and other data to the data collection platform 502, the private network 508 may experience large bandwidth usage and may be technologically designed and arranged to accommodate for such technological issues. Moreover, the computing system environment 500 may also include a public network 510 that may be accessible to remote devices (e.g., remote device 530, remote device 532). In some examples, the remote device may be located not in the proximity (e.g., more than one mile away) of the various sensor, measurement, and data capture systems illustrated in FIG. 5A. In other examples, the remote device may be physically located inside a plant, but restricted from access to the private network 508; in other words, the adjective "remote," need not necessarily require the device to be located at a great distance from the sensor systems and other components.

Although the computing system environment 500 of FIG. 5A illustrates logical block diagrams of numerous platforms and devices, the disclosure is not so limited. In particular, one or more of the logical boxes in FIG. 5 may be combined into a single logical box or the functionality performed by a single logical box may be divided across multiple existing or new logical boxes. For example, aspects of the functionality performed by the data collection platform 502 may be incorporated into one or each of the sensor devices illustrated in FIG. 5A. As such, the data collection may occur local to the sensor device, and the enhanced sensor system may communicate directly with one or more of the control platform and/or data analysis platform. Such an embodiment is contemplated by FIG. 5A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 5A may be combined into an enhanced, multi-purpose sensor system. Such a combined sensor system may provide economies of scale with respect to hardware components such as processors, memories, communication interfaces, and others.

In yet another example, the data collection platform 502, data analysis platform 504, and/or control platform 506 may reside on a single server computer or virtual machine and be depicted as a single, combined logical box on a system diagram. Moreover, a data store may be illustrated in FIG. 5A separate and apart from the data collection platform 502, data analysis platform 504, and/or control platform 506 to store a large amount of values collected from sensors and other components. The data store may be embodied in a database format and may be made accessible to the public network 510; meanwhile, the control platform 506, data collection platform 502, and data analysis platform 504 may be restricted to the private network 508 and left inaccessible to the public network 510. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 510.

Referring to FIG. 5A, process measurements from various sensor and monitoring devices may be used to monitor conditions in, around, and on process equipment (e.g., PSA units). Such sensors may include, but are not limited to, pressure sensors 520, differential pressure sensors (e.g., pressure drop sensors 527), flow sensors 523, temperature sensors 518 including thermal cameras 519 and skin thermocouples, capacitance sensors, weight sensors, gas chromatographs, moisture sensors 525, ultrasonic sensors 524, position sensors (e.g., valve position sensors 526), timing sensors 516, cycle count sensors 517, vibration sensors 521, microphones 522, level sensors, liquid level (hydraulic fluid) sensors, and other sensors commonly found in the refining and petrochemical industry. Further, process laboratory measurements may be taken using gas chromatographs, liquid chromatographs, distillation measurements, octane measurements, and other laboratory measurements. System operational measurements also can be taken to correlate the system operation to the PSA unit measurements.

In addition, sensors may include transmitters and deviation alarms. These sensors may be programmed to set off an alarm, which may be audible and/or visual. Alternatively or additionally, an alert may be sent, such as via email, text message, application alert, or the like.

Other sensors may transmit signals to a processor or a hub that collects the data and sends to a processor. For example, temperature and pressure measurements may be sent to a hub (e.g., data collection platform 502, control platform 506). In one example, temperature sensors 518 may include thermocouples, fiber optic temperature measurement, thermal cameras 519, and/or infrared cameras. Skin thermocouples may be applied to tubes or placed directly on a wall of an adsorption unit. Alternatively, thermal (infrared) cameras 519 may be used to detect temperature (e.g., hot spots) in one or more aspects of the equipment, including tubes. A shielded (insulated) tube skin thermocouple assembly may be used to obtain accurate measurements. One example of a thermocouple may be a removable XTRACTO Pad. A thermocouple can be replaced without any additional welding. Clips and/or pads may be utilized for ease of replacement. Fiber Optic cable can be attached to a unit, line, or vessel to provide a complete profile of temperatures.

Furthermore, flow sensors 523 may be used in flow paths such as the inlet to the path, outlet from the path, or within the path. If multiple tubes are utilized, the flow sensors 523 may be placed in corresponding positions in each of the tubes. In this manner, one can determine if one of the tubes is behaving abnormally compared to other tubes. Flow may be determined by pressure-drop across a known resistance, such as by using pressure taps. Other types of flow sensors 523 include, but are not limited to, ultrasonic, turban meter, hot wire anemometer, vane meter, Kármá™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

Moisture level sensors 525 may be used to monitor moisture levels at one or more locations. For example, moisture levels at an outlet may be measured.

A gas chromatograph on the feed to the PSA unit can be used to speciate the various components to provide empirical data to be used in calculations.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may utilize gas chromatographs, liquid chromatographs, distillation measurements, and/or octane measurements. In another example, equipment information, such as wear, efficiency, production, state, or other condition information, may be gathered and determined based on sensor data.

Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to continue to use, but a monitoring schedule may be adjusted. Alternatively or additionally, one or more inputs or controls relating to a process may be adjusted as part of the corrective action. For example, control platform 506 may adjust one or more pumps 528 or valves 529, which may cause an adjustment to a temperature, a pressure, a flow rate, or the like. These and other details about the equipment, sensors, processing of sensor data, and actions taken based on sensor data are described in further detail below.

Monitoring the PSA units and the processes using PSA units may include collecting data that can be correlated and used to predict behavior or problems in different PSA units used in the same plant or in other plants and/or processes. Data collected from the various sensors (e.g., measurements such as flow, pressure drop, thermal performance, vessel skin temperature at the top, vibration) may be correlated with external data, such as environmental or weather data. Process changes or operating conditions may be able to be altered to preserve the equipment until the next scheduled maintenance period. Fluids may be monitored for corrosive contaminants and pH may be monitored in order to predict higher than normal corrosion rates within the PSA equipment. At a high level, sensor data collected (e.g., by the data collection platform, control platform) and data analysis (e.g., by the data analysis platform) may be used together, for example, for process simulation, equipment simulation, and/or other tasks. For example, sensor data may be used for process simulation and reconciliation of sensor data. The resulting improved process simulation may provide a stream of physical properties that may be used to calculate heat flow, etc. These calculations may lead to thermal and pressure drop performance prediction calculations for specific equipment, and comparisons of equipment predictions to observations from the operating data (e.g., predicted/expected outlet temperature and pressure vs. measured outlet temperature and pressure). This may enable identification of one or issues that may eventually lead to a potential control changes and/or recommendations, etc.

Systems Facilitating Sensor Data Collection

Sensor data may be collected by a data collection platform 502. In one or more embodiments, the data collection platform 502 may be part of the control platform 506 (e.g., the sensors may send data directly to the control platform 506). The sensors may interface with the data collection platform 502 via wired or wireless transmissions. Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known hot spot may be collected at a first interval, and data at a spot that is not a known hot spot may be collected at a second interval. The data collection platform 502 may continuously or periodically (e.g., every second, every minute, every hour, every day, once a week, once a month) transmit collected sensor data to a data analysis platform 504, which may be nearby or remote from the data collection platform 502.

Figures 4, 4B, 5:
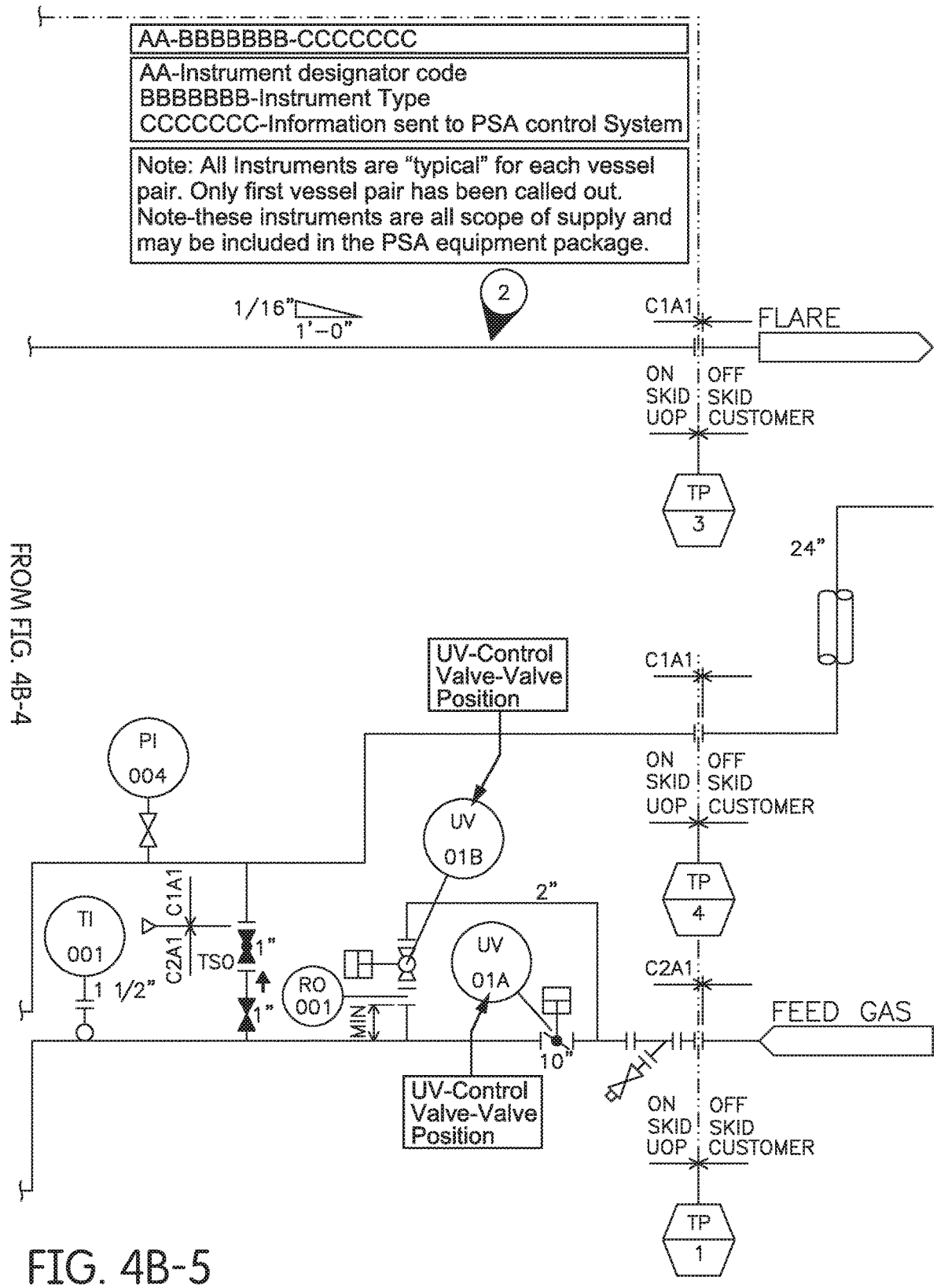
FIG. 5A depicts an illustrative computing environment for managing the operation of one or more pieces of equipment in a plant in accordance with one or more example embodiments.
FIG. 5B depicts an illustrative data collection computing platform for collecting data related to the operation of one or more pieces of equipment in a plant in accordance with one or more example embodiments.
FIG. 5C depicts an illustrative data analysis computing platform for analyzing data related to the operation of one or more pieces of equipment in a plant in accordance with one or more example embodiments.
FIG. 5D depicts an illustrative control computing platform for controlling one or more parts of one or more pieces of equipment in a plant in accordance with one or more example embodiments.
FIG. 5E depicts an illustrative remote device in accordance with one or more example embodiments.
Figure 4C:
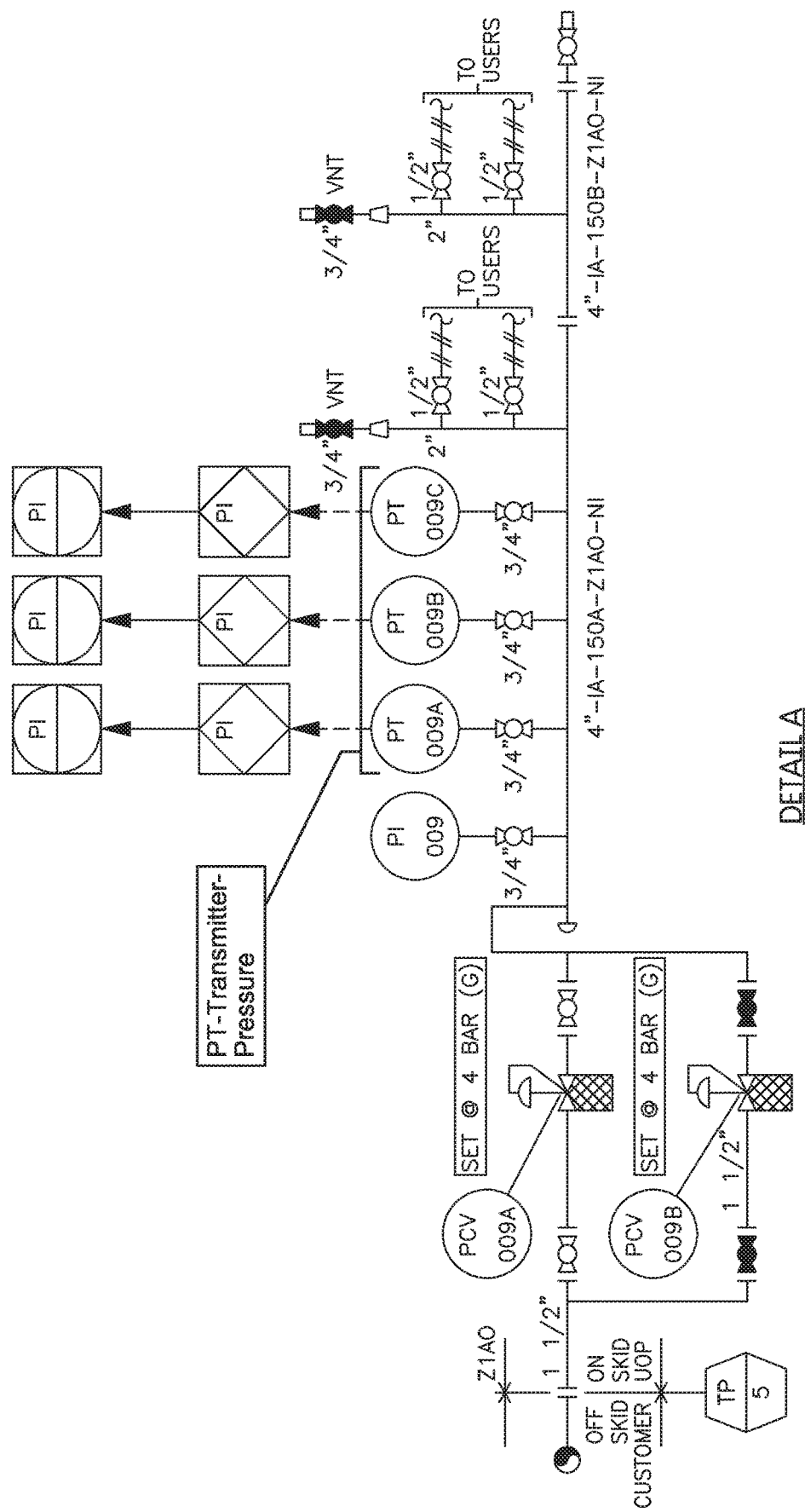
Figure 5A:
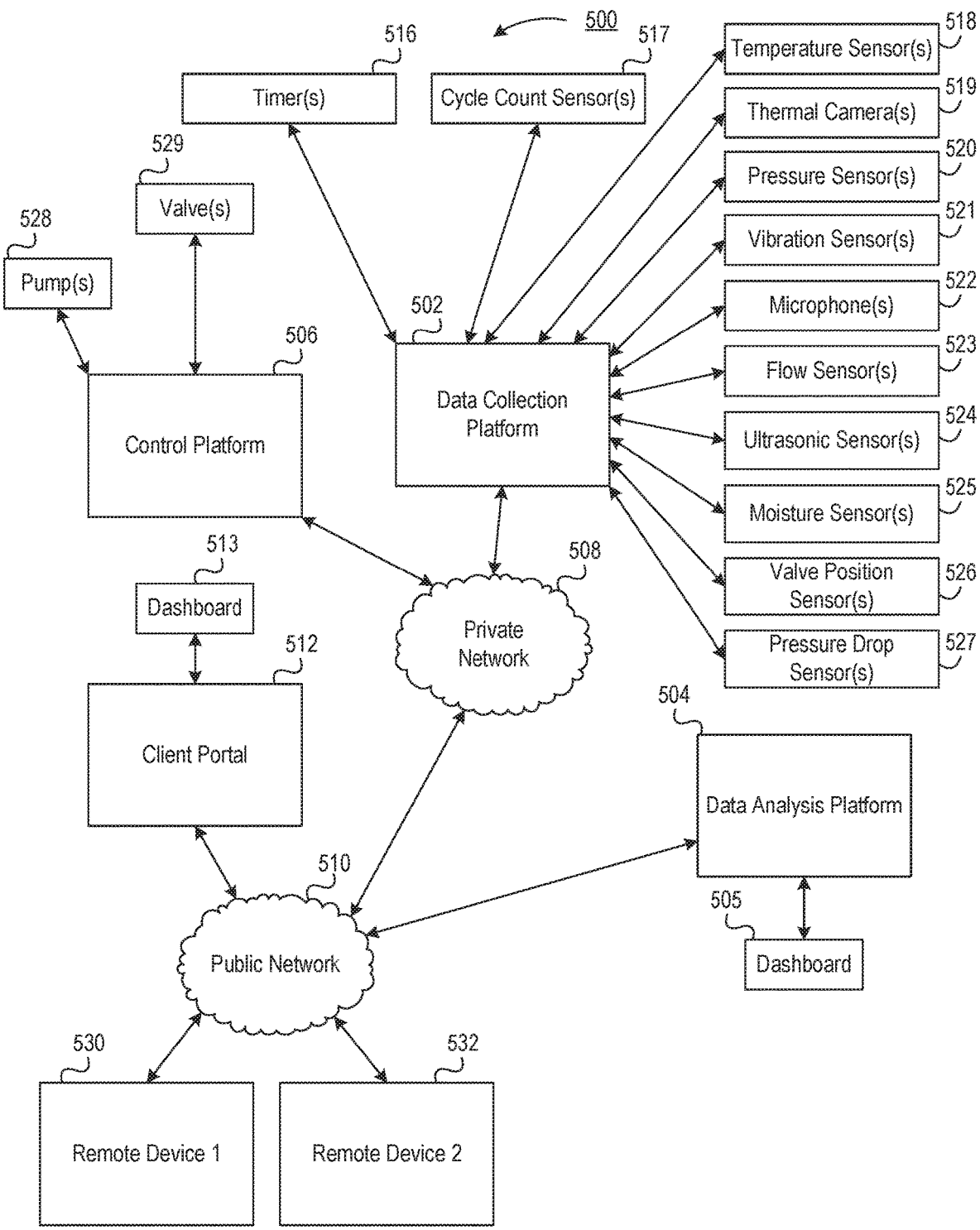
Figure 5B:
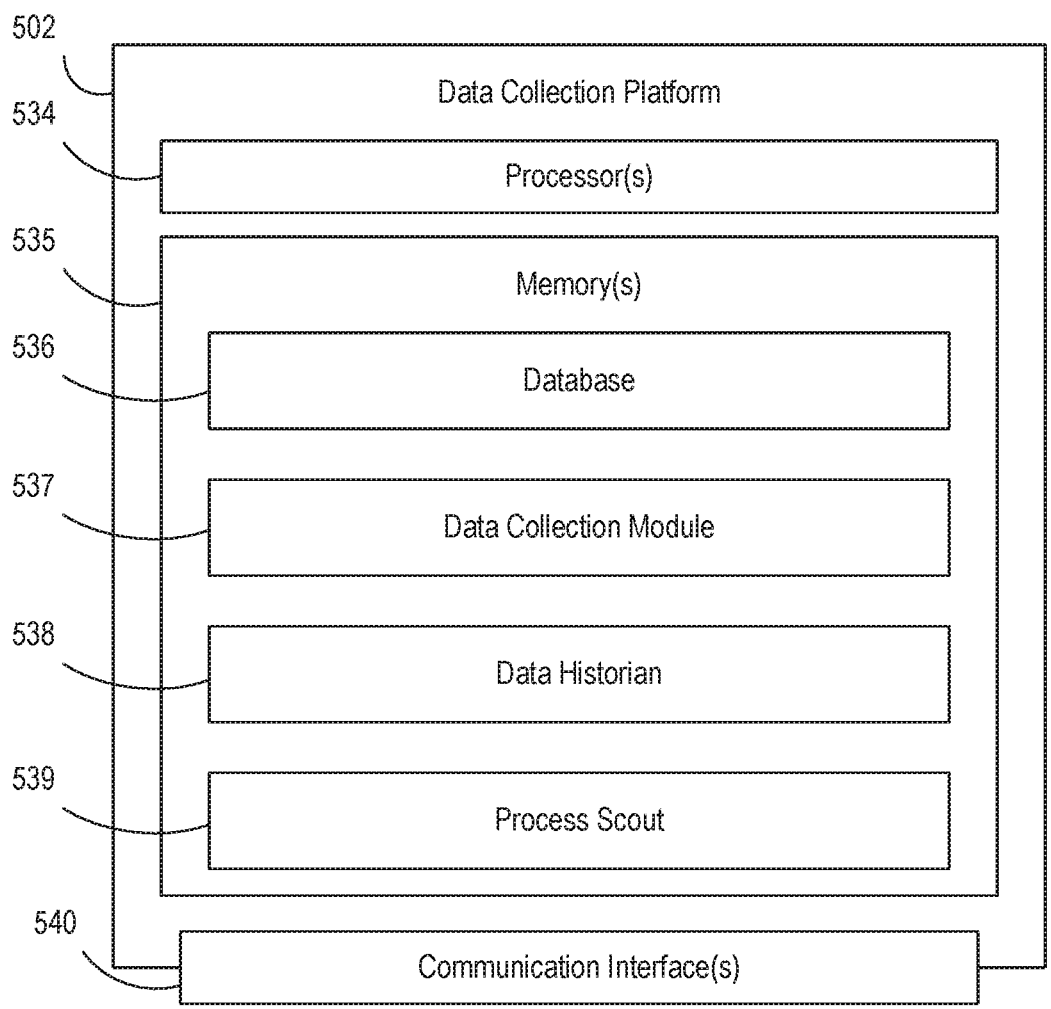
Figure 5C:
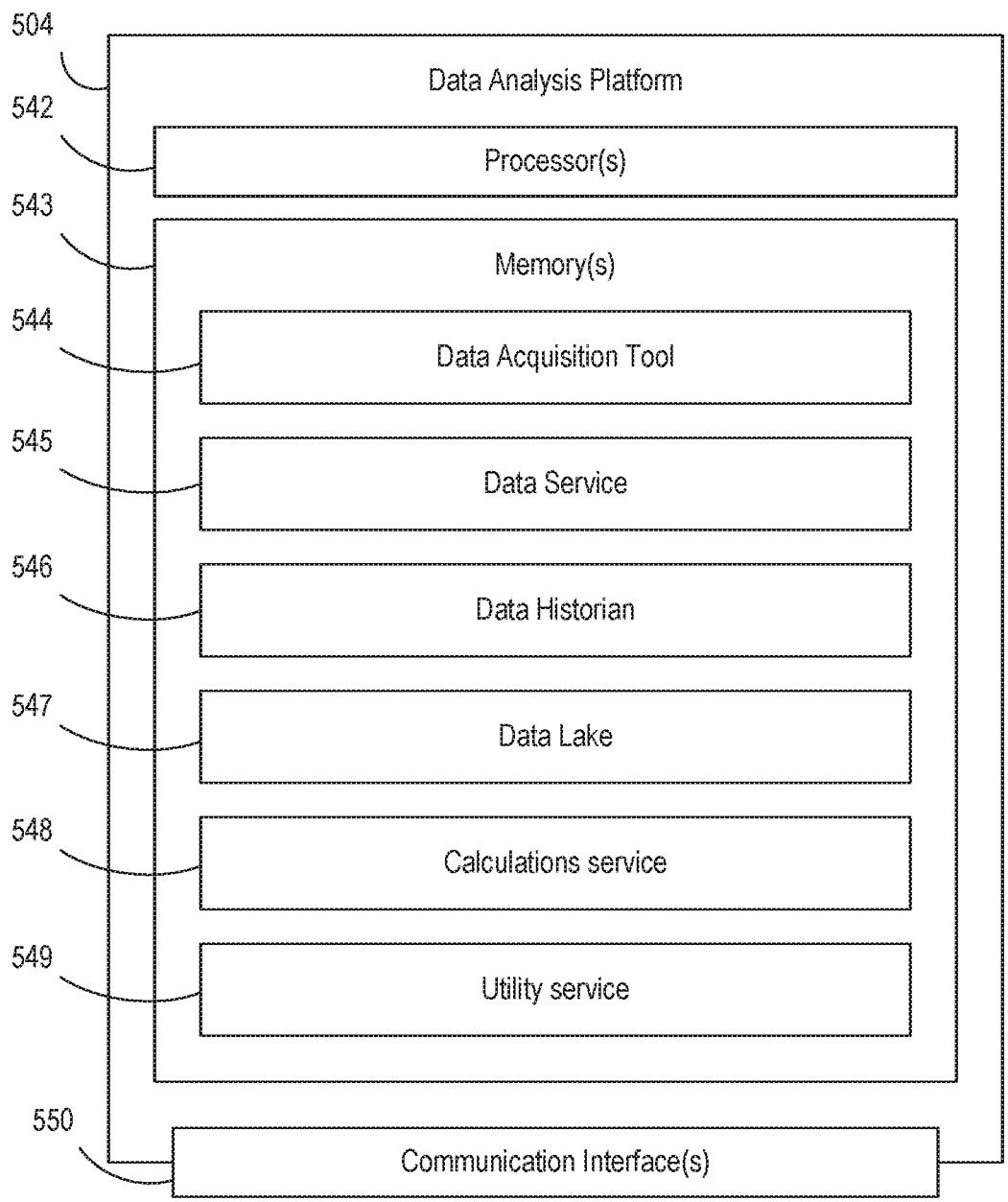
Figure 5D:
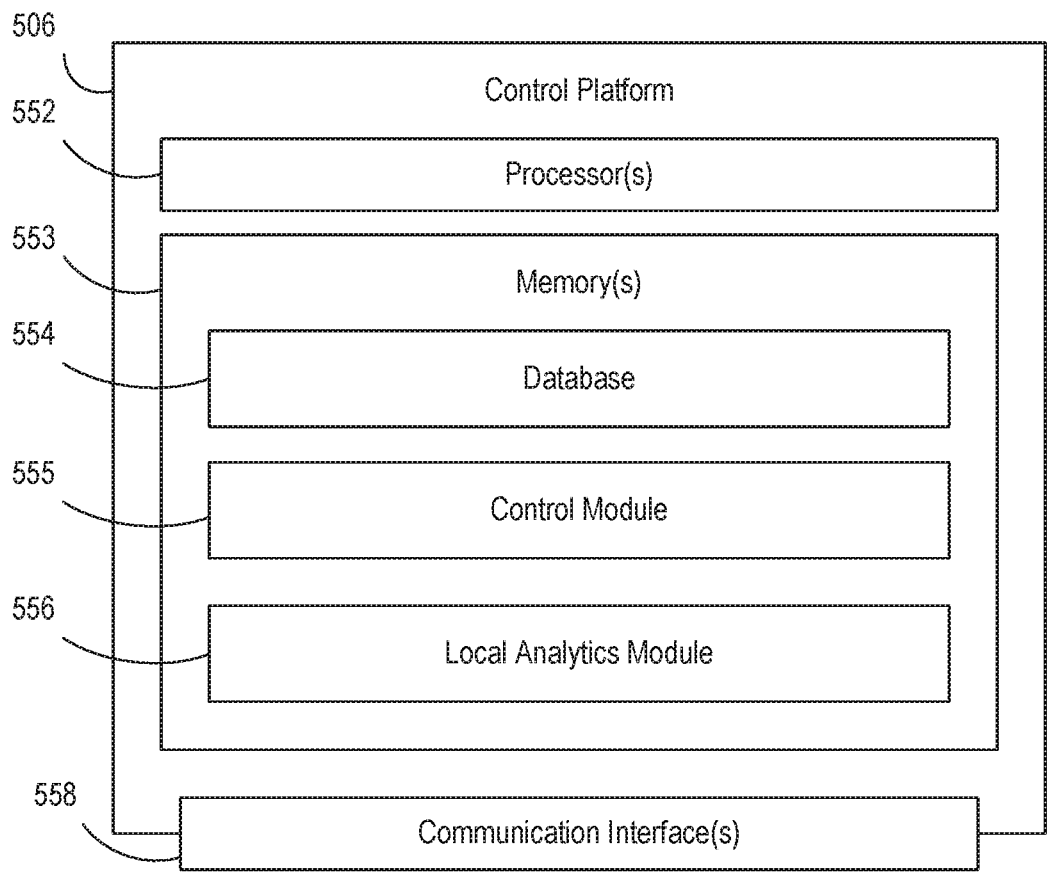
Figure 5E:
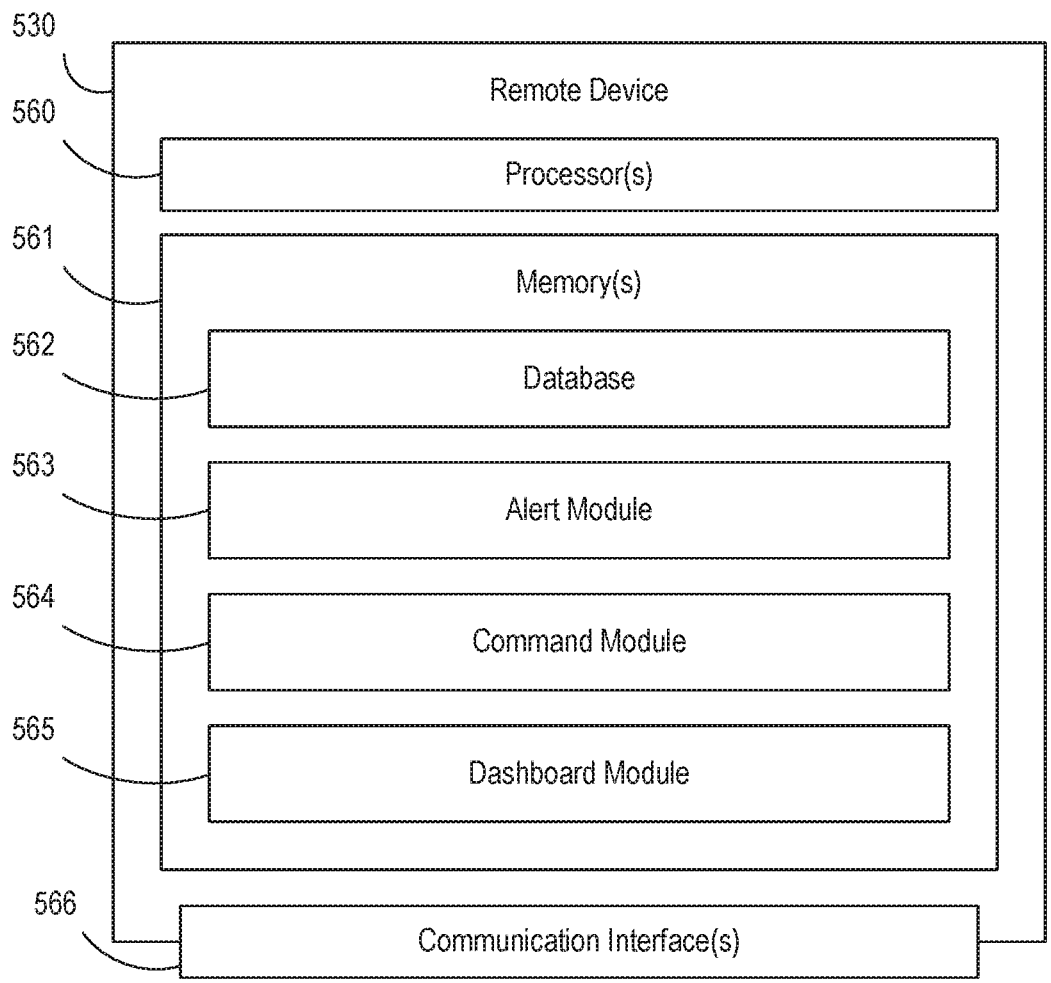

The computing system environment 500 of FIG. 5A includes logical block diagrams of numerous platforms and devices that are further elaborated upon in FIG. 5B, FIG. 5C, FIG. 5D, and FIG. 5E. FIG. 5B is an illustrative data collection platform 502. FIG. 5C is an illustrative data analysis platform 504. FIG. 5D is an illustrative control platform 506. FIG. 5E is an illustrative remote device 530. These platforms and devices of FIG. 5 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, virtual machines, distributed computing environments that include any of the above systems or devices, and the like.

In addition, the platform and/or devices in FIG. 5 may include one or more memories of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform. The memories in the platform and/or devices may further store modules that may comprise compiled software code that causes the platform, device, and/or overall system to operate in a technologically improved manner as disclosed herein. For example, the memories may store software used by a computing platform, such as operating system, application programs, and/or associated database. Alternatively or additionally, a module may be implemented in a virtual machine or multiple virtual machines.

Furthermore, the platform and/or devices in FIG. 5 may include one or more communication interfaces including, but not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, and other protocols.

In some examples, one or more sensor devices in FIG. 5A may be enhanced by incorporating functionality that may otherwise be found in a data collection platform 502. These enhanced sensor system may provide further filtering of the measurements and readings collected from their sensor devices. For example, with some of the enhanced sensor systems in the operating environment illustrated in FIG. 5A, an increased amount of processing may occur at the sensor so as to reduce the amount of data needing to be transferred over a private network in real-time to a computing platform. The enhanced sensor system may filter at the sensor itself the measured/collected/captured data and only particular, filtered data may be transmitted to the data collection platform for storage and/or analysis.

Referring to FIG. 5B, in one example, a data collection platform 502 may comprise a processor 534, one or more memories 535, and communication interfaces 540. The memory 535 may comprise a database 536 for storing data records of various values collected from one or more sources. In addition, a data collection module 537 may be stored in the memory and assist the processor in the data collection platform in communicating with, via the communications interface, one or more sensor, measurement, and data capture systems, and processing the data received from these sources. In some embodiments, the data collection module 537 may comprise computer-executable instructions that, when executed by the processor, cause the data collection platform to perform one or more of the steps disclosed herein. In other embodiments, the data collection module 537 may be a hybrid of software-based and/or hardware-based instructions to perform one or more of the steps disclosed herein. In some examples, the data collection module 537 may assist an enhanced sensor system with further filtering the measurements and readings collected from the sensor devices. In some examples, the data collection module 537 may receive some or all data from a plant or piece of equipment, and/or may provide that data to one or more other modules or servers.

Data collection platform 502 may include or be in communication with one or more data historians 538. The data historian 538 may be implemented as one or more software modules, one or more virtual machines, or one or more hardware elements (e.g., servers). The data historian 538 may collect data at regular intervals (e.g., every minute, every two minutes, every ten minutes, every thirty minutes).

The data historian 538 may include or be in communication with a process scout 539. The process scout 539 may be implemented as one or more software modules, one or more virtual machines, or one or more hardware elements (e.g., servers). The process scout 539 may work with or in place of the data collection module 537 and/or the data historian 538 to handle one or more aspects of data replication.

Although the elements of FIG. 5B are illustrated as logical block diagrams, the disclosure is not so limited. In particular, one or more of the logical boxes in FIG. 5B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 536 in FIG. 5B is illustrated as being stored inside one or more memories in the data collection platform, FIG. 5B contemplates that the database may be stored in a standalone data store communicatively coupled to the data collection module and processor of the data collection platform via the communications interface of the data collection platform.

In addition, the data collection module 537 may assist the processor 534 in the data collection platform 502 in communicating with, via the communications interface 540, and processing data received from other sources, such as data feeds from third-party servers and manual entry at the field site from a dashboard graphical user interface. For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 5C, in one example, a data analysis platform 504 may comprise a processor 542, one or more memories 543, and communication interfaces 550. The memory 543 may comprise a database for storing data records of various values collected from one or more sources. Alternatively, the database may be the same database as that depicted in FIG. 5B and the data analysis platform 504 may communicatively couple with the database via the communication interface 550 of the data analysis platform 504. At least one advantage of sharing a database between the two platforms is the reduced memory requirements due to not duplicating the same or similar data.

In addition, the data analysis platform 504 may include a data acquisition tool 544. In some embodiments, the data acquisition tool 544 may comprise computer-executable instructions that, when executed by the processor, cause the data analysis platform to perform one or more of the steps disclosed herein. In other embodiments, the data acquisition tool 544 may be a virtual machine. In some embodiments, the data acquisition tool 544 may be a hybrid of software-based and/or hardware-based instructions to perform one or more of the steps disclosed herein.

Further, the data analysis platform 504 may include a data service 545. In some embodiments, the data service 545 may comprise computer-executable instructions that, when executed by the processor, cause the data analysis platform to perform one or more of the steps disclosed herein. In other embodiments, the data service 545 may be a virtual machine. In some embodiments, the data service 545 may be a hybrid of software-based and/or hardware-based instructions to perform one or more of the steps disclosed herein.

Also, the data analysis platform may include a data historian 546. In some embodiments, the data historian 546 may comprise computer-executable instructions that, when executed by the processor, cause the data analysis platform to perform one or more of the steps disclosed herein. In other embodiments, the data historian 546 may be a virtual machine. In some embodiments, the data historian 546 may be a hybrid of software-based and/or hardware-based instructions to perform one or more of the steps disclosed herein. The data historian 546 may collect data at regular intervals (e.g., every minute, every two minutes, every ten minutes, every thirty minutes).

Additionally, the data analysis platform 504 may include a data lake 547. In some embodiments, the data lake 547 may comprise computer-executable instructions that, when executed by the processor, cause the data analysis platform to perform one or more of the steps disclosed herein. In other embodiments, the data lake 547 may be a virtual machine. In some embodiments, the data lake 547 may be a hybrid of software-based and/or hardware-based instructions to perform one or more of the steps disclosed herein. The data lake 547 may perform relational data storage. The data lake 547 may provide data in a format that may be useful for processing data and/or performing data analytics.

Moreover, the data analysis platform 504 may include a calculations service 548. In some embodiments, the calculations service 548 may comprise computer-executable instructions that, when executed by the processor, cause the data analysis platform to perform one or more of the steps disclosed herein. In other embodiments, the calculations service 548 may be a virtual machine. In some embodiments, the calculations service 548 may be a hybrid of software-based and/or hardware-based instructions to perform one or more of the steps disclosed herein. The calculations service 548 may collect data, perform calculations, and/or provide key performance indicators. The calculations service 548 may implement, for example, process dynamic modeling software or tools (e.g., UniSim).

Furthermore, the data analysis platform 504 may include a utility service 549. In some embodiments, the utility service 549 may comprise computer-executable instructions that, when executed by the processor, cause the data analysis platform to perform one or more of the steps disclosed herein. In other embodiments, the utility service 549 may be a virtual machine. In some embodiments, the utility service 549 may be a hybrid of software-based and/or hardware-based instructions to perform one or more of the steps disclosed herein. The utility service 549 may take information from the calculations service 548 and put the information into the data lake 547. The utility service 549 may provide data aggregation service, such as taking all data for a particular range, normalizing the data (e.g., determining an average), and/or combining the normalized data into a file to send to another system or module.

One or more components of the data analysis platform 504 may assist the processor in the data analysis platform in processing and analyzing the data values stored in the database. In some embodiments, the data analysis platform 504 may perform statistical analysis, predictive analytics, and/or machine learning on the data values in the database to generate predictions and models. For example, the data analysis platform 504 may analyze sensor data to detect new hot spots and/or to monitor existing hot spots (e.g., to determine if an existing hot spot is growing, maintaining the same size, or shrinking) in the equipment of a plant. The data analysis platform 504 may compare temperature data from different dates to determine if changes are occurring. Such comparisons may be made on a monthly, weekly, daily, hourly, real-time, or some other basis.

The data analysis platform 504 may generate recommendations for adjusting one or more parameters for the operation of the plant environment depicted in FIG. 5A. In some embodiments, the data analysis platform 504 may, based on the recommendations, generate command codes that may be transmitted, via the communications interface, to cause adjustments or halting/starting of one or more operations in the plant environment. The command codes may be transmitted to a control platform 506 for processing and/or execution. In an alternative embodiment, the command codes may be directly communicated, either wirelessly or in a wired fashion, to physical components at the plant, where the physical components comprise an interface to receive the commands and execute them.

Although the elements of FIG. 5C are illustrated as logical block diagrams, the disclosure is not so limited. In particular, one or more of the logical boxes in FIG. 5C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database of data analysis platform 504 may be stored inside one or more memories in the data analysis platform 504, this disclosure contemplates that the database may be stored in a standalone data store communicatively coupled to the processor of the data analysis platform 504 via the communications interface 550 of the data analysis platform 504. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 5D, in one example, a control platform 506 may comprise a processor 552, one or more memories 553, and communication interfaces 558. The memory 553 may comprise a database 554 for storing data records of various values transmitted from a user interface, computing device, or other platform. The values may comprise parameter values for particular equipment at the plant. For example, some illustrative equipment at the plant that may be configured and/or controlled by the control platform 506 include, but is not limited to, a feed switcher, sprayer, one or more valves 529, one or more pumps 528, one or more gates, and/or one or more drains. In addition, a control module 555 may be stored in the memory and assist the processor in the control platform in receiving, storing, and transmitting the data values stored in the database. In some embodiments, the control module 555 may comprise computer-executable instructions that, when executed by the processor, cause the control platform to perform one or more of the steps disclosed herein. In other embodiments, the control module 555 may be a hybrid of software-based and/or hardware-based instructions to perform one or more of the steps disclosed herein.

The control platform 506 may include a local analytics module 556. In some embodiments, a control program (e.g., that runs PSA processes) may include an embedded analytics module. Calculating analytics locally (e.g., rather than remotely on the cloud) may provide some benefits, such as increased response time for providing real-time information to local plant systems. For example, if a thousand valves that each open and close 10 times a second are each providing operating information to the local control platform, the sheer volume of data may introduce a delay in calculating short-term maintenance-required calculations, analytics, or alerts if there is not sufficient bandwidth between the plant and the remote cloud processing system. Thus, a subset of the analytics data (e.g., analytics data relevant to realtime operating information, equipment for which a delayed failure alert may result in a catastrophic failure, or the like) may be processed and provided locally, while other data (e.g., analytics data related to long-time trends, historical analytics data, or the like) may be sent to a cloud platform for processing. In some embodiments, all the data is sent to the cloud, including the data that is processed locally. The data processed locally may be used for providing realtime information, such as alerts or control system changes, and sent to the cloud for logging, storage, long-term or historical trends analysis, or the like. The local version of the data may be discarded after a certain time period. In some embodiments, all data may be processed locally. Local and/or cloud data may be combined on a dashboard, or alternatively may be provided on separate dashboards.

In a plant environment such as illustrated in FIG. 5A, if sensor data is outside of a safe range, this may be cause for immediate danger. As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module 563 in FIG. 5E.

Referring to FIG. 5E, in one example, a remote device 530 may comprise a processor 560, one or more memories 561, and communication interfaces 566. The memory 561 may comprise a database 562 for storing data records of various values entered by a user or received through the communications interface 566. In addition, an alert module 563, command module 564, and/or dashboard module 565 may be stored in the memory and assist the processor in the remote device in processing and analyzing the data values stored in the database. In some embodiments, the aforementioned modules may comprise computer-executable instructions that, when executed by the processor, cause the remote device to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface 566. The values may indicate a dangerous condition or even merely a warning condition due to odd sensor readings. The command module 564 in the remote device may generate a command that when transmitted through the communications interface to the platforms at the plant, causes adjusting of one or more parameter operations of the plant environment depicted in FIG. 5A. In some embodiments, the dashboard module 565 may display a graphical user interface to a user of the remote device to enable the user to enter desired parameters and/or commands. These parameters/commands may be transmitted to the command module 564 to generate the appropriate resulting command codes that may be then transmitted, via the communications interface 566, to cause adjustments or halting/starting of one or more operations in the plant environment. The command codes may be transmitted to a control platform 506 for processing and/or execution. In an alternative embodiment, the command codes may be directly communicated, either wirelessly or in a wired fashion, to physical components at the plant such that the physical components comprise an interface to receive the commands and execute them.

Although FIG. 5E is not so limited, in some embodiments the remote device 530 may comprise a desktop computer, a smartphone, a wireless device, a tablet computer, a laptop computer, and/or the like. The remote device 530 may be physically located locally at or remotely from the plant, and may be connected by one or more communications links to the public network 510 that is linked via a communications link to the private network 508. The network used to connect the remote device 530 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 5E are illustrated as logical block diagrams, the disclosure is not so limited. In particular, one or more of the logical boxes in FIG. 5E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 562 is visually depicted in FIG. 5E as being stored inside one or more memories in the remote device, FIG. 5E contemplates that the database may be stored in a standalone data store communicatively coupled, via the communications interface, to the modules stored at the remote device and processor of the remote device 530.

Referring to FIG. 5, in some examples, the performance of operation in a plant may be improved by using a cloud computing infrastructure and associated methods, as described in U.S. Patent Application Publication No. 2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies which may be acted upon to optimize impact, including financial or other impact.

At the stack level, the cloud-computing infrastructure may provide a secure, scalable infrastructure for collecting, aggregating and storing data, allowing connected "things" to communicate, making an offering/SaaS solution available, IaaS/PaaS, and/or data lakes.

Different devices, systems, and/or platforms may be connected via the cloud or direct, remote connection (e.g., Lyric Thermostat, SaaS). Furthermore, the disclosure may include infrastructure enabling connected services (e.g., Sentience).

The aforementioned cloud computing infrastructure may use a data collection platform 502 (such as process scout) associated with a plant to capture data, e.g., sensor measurements, which may be automatically sent to the cloud infrastructure, which may be remotely located, where it is reviewed to, for example, eliminate errors and biases, and used to calculate and report performance results. The data collection platform 502 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant may be compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 502 may comprise an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model may predict plant performance that is expected based upon plant operation information. The plant process model results can be used to monitor the health of the plant and to determine whether any upset or poor measurement occurred. The plant process model may be generated by an iterative process that models at various plant constraints to determine the desired plant process model.

Using a web-based system for implementing the method of this disclosure provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one embodiment, the system may be performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 6A:
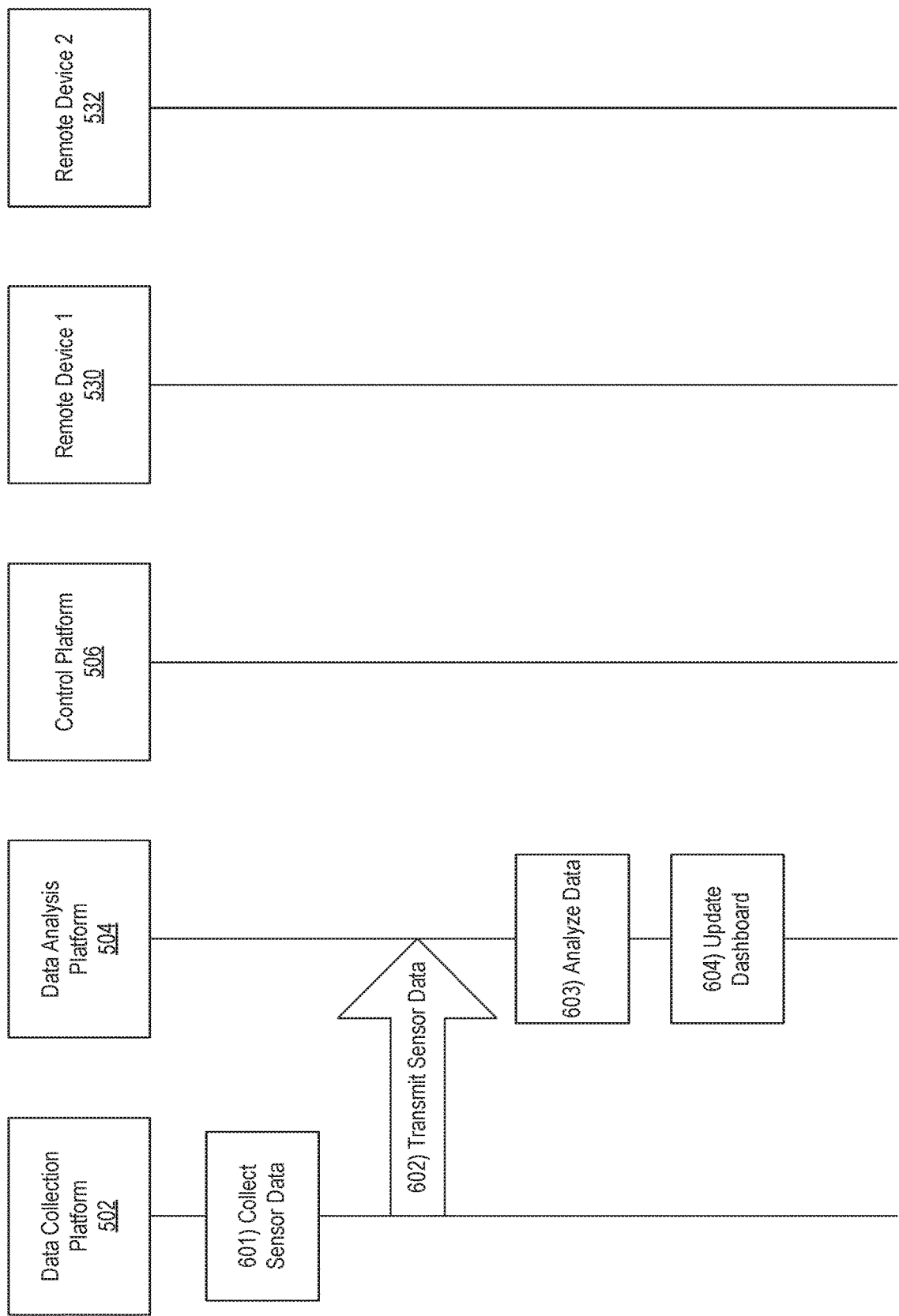

FIGS. 6A-6B depict illustrative system flow diagrams in accordance with one or more embodiments described herein. As shown in FIG. 6A, in step 601, data collection platform may collect sensor data. In step 602, data collection platform may transmit sensor data to data analysis platform. In step 603, data analysis platform may analyze data. In step 604, data analysis platform may update one or more dashboards.

As shown in FIG. 6B, in step 605, data analysis platform may send an alert to remote device 1 and/or remote device 2. In step 606, data analysis platform may receive a command from remote device 1 and/or remote device 2. In some embodiments, the control platform may receive the command from remote device 1 and/or remote device 2. In step 607, data analysis platform may send a command to control platform. In some embodiments, the command may be similar to the command received from remote device 1 and/or remote device 2. In some embodiments, data analysis platform may perform additional analysis based on the received command from remote device 1 and/or remote device 2 before sending a command to control platform. In step 608, control platform may adjust an operating parameter. The adjusting the operating parameter may be based on the command received from data analysis platform, remote device 1, and/or remote device 2. The adjusting the operating parameter may be related to one or more pieces of equipment (e.g., PSA unit) associated with sensors that collected the sensor data in step 601. For example, a flow rate may be increased or decreased, a valve may be opened or closed, a pressure may be increased or decreased, a temperature may be increased or decreased, a process may be started, stopped, extended, or shortened, or the like.

Detecting and Addressing Problems with PSA Units

Aspects of the present disclosure are directed to monitoring PSA unit processes for potential and existing issues, providing alerts, and/or adjusting operating conditions to optimize PSA unit life. There are many process performance indicators that may be monitored including, but not limited to, flow rates, chemical analyzers, temperature, and/or pressure. In addition, valve operation may be monitored, including opening speed, closing speed, and performance.

In some embodiments, a system may determine operating characteristics. The system may determine system performance characteristics. The system may determine optimal operating characteristics. In some embodiments, the optimal operating characteristics may be based on a designed-for operating level, a regulation (e.g., a minimum hydrogen purity), or one or more other criteria. The system may determine whether there is a difference between recent operating performance and the optimal operating performance. If there is a difference, the system may suggest adjusting one or more operating characteristics to decrease the difference between the actual operating performance in the recent and the optimal operating performance.

In some embodiments, the system may automatically adjust the one or more operating characteristics. Alternatively or additionally, the system may provide an alert or other information to a remote device (e.g., a mobile device of an operator), with a request to adjust the one or more operating characteristics and/or to take another necessary action to optimize performance. In one example the system may transfer operation of one adsorbent unit to another adsorbent unit in order to replace a valve or replace contaminated adsorbent.

Periodically, the system may determine whether there is a difference between the actual operating performance and the optimal performance, and if so, again adjust operating characteristics to decrease the difference. Alternatively or additionally, in some embodiments, the system may notify the operator to take necessary action to optimize the performance.

For example, the system may provide a recommendation or set of recommendations to improve operations of the unit. In one or more embodiments, the system may provide an alert recommending that some action is taken (e.g., perform maintenance on Valve XXX). Additionally, in one or more embodiments, with the different Process Indicators being tracked on the dashboard, the system may provide a summary that may include an explanation of the takeaway message of the impact of operating in a particular manner.

For example: Product Purity. A unit may be designed for 99.9% Hydrogen Purity. The plant may be operating at 99.95% Hydrogen Purity. This operation is conservative and is impacting the plant's Hydrogen recovery by X. The system may determine and/or recommend that, to operate at the design recovery level, an adjustment to Y and Z. This recommendation may be displayed on the dashboard, delivered as an alert, and/or sent to the control platform to be implemented.

By iteratively reviewing recent performance and adjusting characteristics, the system may thereby optimize the operating performance for a PSA unit. This may result in improved performance, e.g., extend valve life, extend adsorbent life, reduce energy use, optimize plant output.

Processing Sensor Data

One or more calculations may be performed for PSA unit remote monitoring service. These calculations may assist in alerting and helping diagnose the status of valves and other components used in PSA units. A PSA unit may over 100 valves, all cycling extremely fast. The valves may last an average of 3 to 5 years. But some may last only two years, while some may last ten years. But eventually all the valves wear out because they're opening and closing so fast so many times. The data processing platform may monitor valve performance and identify before a valve fails.

The data processing platform may receive (e.g., from one or more sensors) one or more operational parameters, which may be used alone or in combination for determining the efficiency of the PSA units, e.g., adsorber vessels. For example, one or more operational parameters may include (e.g., for a valve) an amount of overshoot, a number of oscillations, a lag between a feedback and an output, an open time, a stroke time, a close time. As discussed previously, the system may collect sensor information, put it into data traps, and send it through the system, such that the system can review and analyze high-speed information based on regular (e.g., one-minute) data pulls.

The data processing platform may perform heuristic analysis on the sensor data. The data processing platform may analyze the sensor data to look for variations in the data over time. E.g., the data analysis platform may determine a minor change in a way the valve operates over time, based on having collected and analyzed data on thousands of valve operations. The data analysis platform may receive data from one plant or from multiple plants. Valves with partially or wholly similar specifications (e.g., the soft goods, the positioners, the actuators, the complete build itself (every single component identical) may be used at a variety of plants, multiple of which send valve operating information to the data processing platform. The data analysis platform may identify a minor change as being an indicator of a failure that is coming.

In one or more embodiments, the data processing platform may determine whether values in the sensor data exceed certain thresholds. As an example, the data processing platform may analyze valve data to see if a particular valve operation deviates from an average operation of other valves in similar service (e.g., in a same piece of equipment, in a same plant, in a same piece of equipment at a different plant, or the like).

Alternatively or additionally, the data processing platform may look for a step change in operating parameter. For example, if a valve was taking three seconds to open, then suddenly starts taking four or five seconds to open, the data processing platform may flag that valve as a valve that may fail soon in the future. Thus, the data processing platform may help identify valves before they fail.

The data processing platform may perform online or offline data analytics to identify when there has been discrete failures for valves. The data processing platform may analyze the data leading up to a valve failure to identify patterns—what is the opening time, the close time, the oscillations, etc. In one or more embodiments, one or more third-party tools may be used to help with pattern recognition, to help identify events that occurred, to find common patterns that lead up to a failure, or the like.

The data processing platform may use one or more design parameters, alone or in combination, for determining the status of the PSA unit. A design parameter may be a level at which the PSA unit was designed to operate at, below, or above. For example, a PSA unit may be designed to achieve 99.99% hydrogen purity.

The data processing platform may analyze the sensor data to determine new thresholds. For example, a valve vendor may say the valve is good for 500 k strokes. At 500 k strokes, one or more warnings may be provided—e.g., the valve may need preventative maintenance, based solely on stroke count. Some plants may ignore recommended operating thresholds, and run the valve straight to failure. The data processing platform may analyze valve failures in those conditions, and determine a new threshold based on actual failure time. For example, the data processing platform may determine that a valve that has a recommended life of 500 k strokes, in typical use, frequently lasts until 650 k strokes before failing. Thus, the data processing platform may determine and provide a new recommended operating threshold of 650 k strokes (or 300 k, or whatever the actual data shows). In other embodiments, the data analysis platform may identify commonalities among failures of other pieces of equipment, and use those identified commonalities to update thresholds to make them more accurate.

The data processing platform, when analyzing equipment, may take into account similarities or differences between different pieces of equipment. For example, the data processing platform may take into account a positioner model, a size on an actuator, or the like. Sensor data may include or be tagged with equipment information. As an example, sensor data from a valve may include complete valve build information—including actuator sizes, model numbers, valve body material, stem material, bearing material—or the like. The equipment information may be built into a model so the data processing platform can do more detailed analytics to look for commonalities.

Thus, edge data collection may be combined with monitoring and cloud analytics to provide new recommendations for operating parameters or conditions.

In one or more embodiments, the data processing platform may adjust data analysis based on an accumulated error between a feedback and an output command. The data processing platform may allow certain tolerances.

In some instances, the timestamp of a calculated attribute may match the timestamp of the raw data used for the calculation. In some instances, a calculated attribute may use one or more results of one or more other calculated attributes; therefore, the order in which the attributes are calculated may be relevant.

In some embodiments, raw values may be checked for bad values. If bad values are detected, the data processing platform may either skip calculation or replace the bad value with NULL, as appropriate for subsequent calculations. For averages, a provision may be made to skip bad/null values and/or timestamps.

Some units of measurement for variables may be specified. Some variables may be dimensionless, and therefore might not have a defined unit of measurement.

Dashboard

Figures 2, 7A:
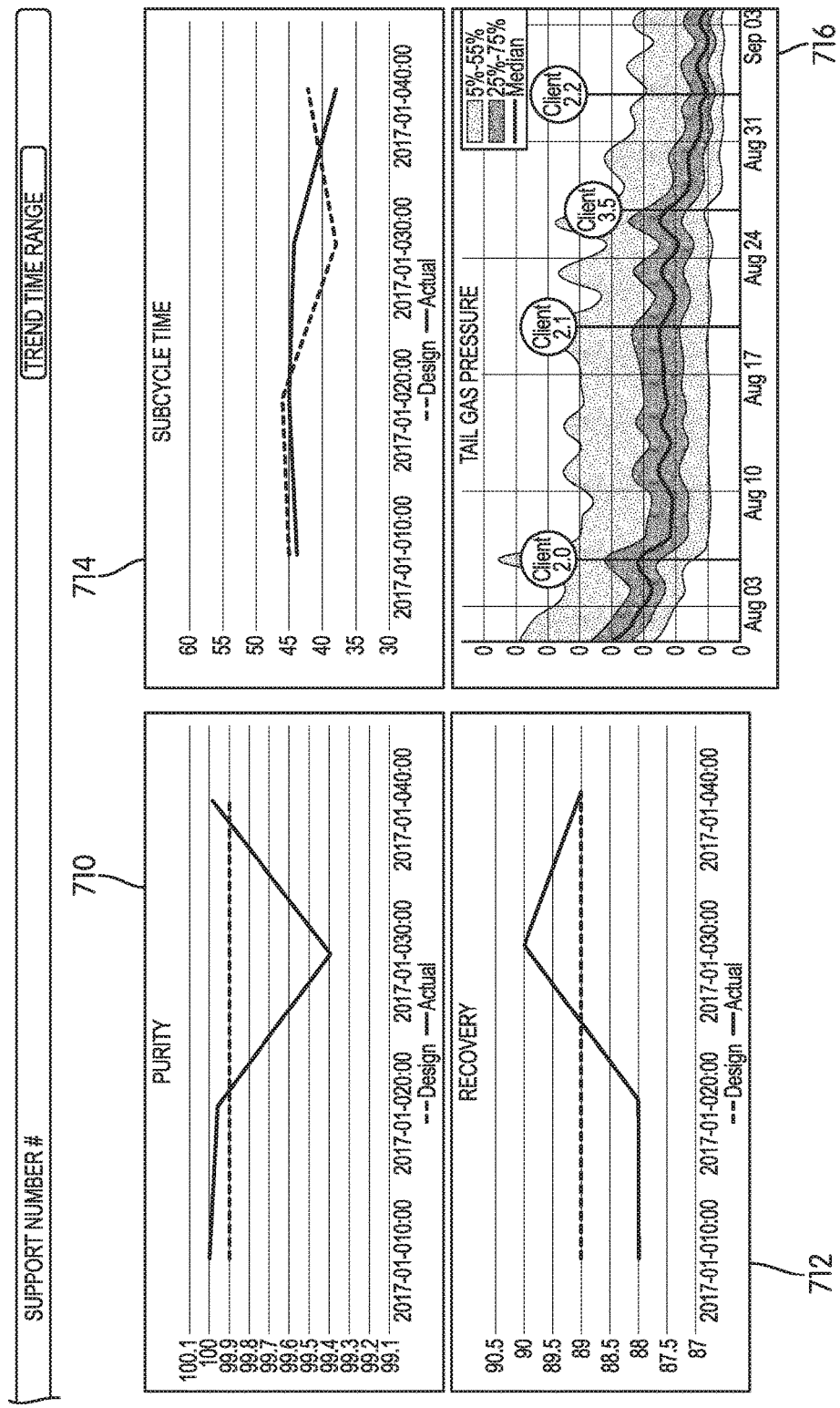
FIG. 7A (7A-1 through 7A-2) depicts an illustrative dashboard for viewing information and/or taking actions related to one or more aspects of a plant operation in accordance with one or more example embodiments.

FIG. 7A depicts an illustrative dashboard that may include information about the operation of a PSA unit in accordance with one or more aspects described herein. The dashboard may include or be a part of one or more graphical user interfaces of one or more applications that may provide information received from one or more sensors or determined based on analyzing information received from one or more sensors, according to one or more embodiments described herein. The dashboard may be displayed as part of a smartphone application (e.g., running on a remote device, such as remote device 1 or remote device 2), a desktop application, a web application (e.g., that runs in a web browser), a web site, an application running on a plant computer, or the like.

The dashboard may be different based on an intended user of the dashboard. For example, as depicted in FIG. 5A, one or more systems may interface with a dashboard (e.g., the data analysis platform 504, the client portal 512). The data analysis platform dashboard may be provide the same or different information, charts, graphs, buttons, functions, etc., as the client portal dashboard.

Returning to FIG. 7A, the dashboard may include one or more visual representations of data (e.g., chart, graph) that shows information about a plant, a particular piece of equipment in a plant, or a process performed by a plant or a particular piece or combination of equipment in the plant. For example, a graph may show information about a purity level, a recovery level, a temperature, a pressure, an operating condition, an efficiency, a production level, or the like. The dashboard may include a description of the equipment, the combination of equipment, or the plant to which the visual display of information pertains.

The dashboard may display the information for a particular time or period of time (e.g., the last five minutes, the last ten minutes, the last hour, the last two hours, the last 12 hours, the last 24 hours, multiple days, multiple months). The dashboard may be adjustable to show different ranges of time, automatically or based on user input.

The dashboard may include a contact name and/or contact information (e.g., telephone number, pager number, email address, text message number, social media account name) for a sales representative. Then, for example, if a dashboard user needs assistance (e.g., purchasing more equipment, seeking assistance for repairs, finding out more information about purchased products), the dashboard user may easily contact the sales representative.

The dashboard may include a contact name and/or contact information for technical support. Then, for example, if the dashboard user using the dashboard needs assistance (e.g., interpreting dashboard data, adjusting a product level, adjusting an equipment setting, adjusting an operating characteristic), the dashboard user may easily contact technical support.

The dashboard may display a time and/or date range of the time and/or date range for which data is being displayed. A pop-up window may be triggered (e.g., by selecting an interface option, such as a drop-down arrow) to change a time period. The pop-up window may allow selection of a time period (e.g., years, quarters, months, weeks, days, hours, minutes) for displaying data. The pop-up window may allow selection of a range of data for a selected time (e.g., previous week, this week, next week, last x number of weeks, next x number of weeks, week to date).

The dashboard may include, on one or more graphs, a line indicating an optimum operating level. Specifically, the line may indicate, based on one or more calculations, an optimum level at which a particular PSA unit should be operated (e.g., relative to a particular operating characteristic) to achieve an optimization goal. The optimum operating level may be dynamic, based on a re-calculation of an optimum operating level using one or more operational and/or design characteristics. In an example, the optimization goal may be to optimize a life of the PSA unit, adsorbent, or valve, or the like.

The dashboard may include, on one or more graphs, a line indicating a design level. Specifically, the line may indicate the level at which the equipment was designed to operate. The design line may be static. The design line may be based on an actual operating condition of another factor. The design line may be provided by, e.g., an entity associated with a design of the equipment, the plant, or the like.

The dashboard may include, on one or more graphs, a line, bar, or other indicator of an actual operating result. The actual operating result may be related to a time and/or date range (e.g., the displayed time and/or date range). For example, the graph may indicate PSA subcycle time and capacity factor of the PSA; purity; recovery; or tail gas pressure swing. The number of cycles can be specified. The actual operating result line may be dynamic.

The dashboard may include one or more colored banners or shapes that may correspond to one or more current operating conditions corresponding to one or more graphs of the dashboard. The colored banners or shapes may include one or more colors (e.g., green, yellow, red), which may correspond to one or more operating conditions of PSA equipment. For example, 708 shows a simple layout of PSA with selectable valves and vessels to view more details on status of particular pieces of equipment. For example, a circle may correspond to a valve. A rectangle may correspond to a vessel. The dashboard may further include icons corresponding to a product stream, a tail gas stream, and/or a feed stream. If a valve or vessel is at an acceptable level or state, the colored banner or shape may be green. If the valve or vessel is at a level or state that necessitates increased monitoring or that may indicate an impending need (e.g., maintenance), the colored banner or shape may be yellow. If the valve or vessel is at a problematic level or state, the colored banner or shape may be red.

The depicted vessels and/or valves may provide additional information in response to a received input. For example, if an input includes hovering over a particular vessel icon, additional information about that vessel may be displayed. If the input includes clicking or tapping on a particular vessel icon, even more information about that vessel may be displayed. Similarly, if an input includes hovering over a particular valve icon, additional information about that valve may be displayed. If the input includes clicking or tapping on a particular valve icon, even more information about that valve may be displayed. For example, information may include health status of a vessel or valve, the number of openings/closings of the valve over its life, information on adsorbent in a vessel, identification of an impending maintenance need of the vessel or valve, or the like.

The depicted streams (e.g., product stream, tail gas stream, and/or feed stream) may provide information about the particular stream (e.g., in response to a input, such as a hover, selection, tap, click). For example, the information may include an indication of a stream makeup (e.g., how much of a particular chemical is in a particular stream), a purity, a pressure, a flow rate, or the like of the stream.

The dashboard may include a graph 710 that shows hydrogen purity to see where the system has been operating over a certain selectable timeline. The graph may include a first line that indicates an ideal or desired level, and a second line that indicates an actual operating level. The graph may correspond with a colored banner at the bottom of the screen. The banner may indicate if the hydrogen purity is within in a suitable range (e.g., green), a lower but acceptable range (e.g., yellow), or is out of range (e.g., red).

The dashboard may include a graph 712 that shows hydrogen recovery to see where the system has been operating over a certain selectable timeline. The graph may include a first line that indicates an ideal or desired level, and a second line that indicates an actual operating level. The graph may correspond with a colored banner at the bottom of the screen. The banner may indicate if the hydrogen recovery is within in a suitable range (e.g., green), a lower but acceptable range (e.g., yellow), or is out of range (e.g., red).

The dashboard may include a graph 714 that shows PSA subcycle time and capacity factor of the PSA over a period of time for easily viewable history. The graph may include a first line that indicates an ideal or desired level and a second line that indicates an actual operating level. The graph may correspond with a colored banner at the bottom of the dashboard. The banner may indicate if the subcycle time is in a suitable range (e.g., green), an acceptable range (e.g., yellow), or is out of range (e.g., red).

The dashboard may include a graph 716 that shows tail gas pressure swing with variance area for the tail gas distribution within a certain number of PSA cycles. The number of cycles can be specified. There may also be points or flags for PSA events such as upstream/downstream process events, switchovers, and significant system alarms. The graph may depict $O_2$ concentration in the stack over a time period (e.g., six weeks).

The dashboard may have an equipment health section 718 that shows the status of the equipment based on the equipment selected in the layout of 708. Equipment health section 718 may display measurements/calculations of one or more variables, as depicted in FIG. 7B.

As depicted in FIG. 7B, valve information may include, for example, Opening Stroke Time, Closing Stroke Time, Cycle Count, Travel Distance, Feedback vs Output Deviation, initial Valve Opening (per PID loop) vs Average, Time since last PM, Date/Quarter until XXX,XXXth cycle reached (at current rates), Leak detection, Valve Health Report.

Product stream information may include, for example, Purity, Recovery, Key Impurity Component composition (% or ppm), Performance Alert, Pressure vs design, Temperature.

Vessel information may include, for example, Cycle Count, Vessel Install Date, Adsorbent Load Date, Vessel DP vs Average, Number of alarms associated with the vessel vs average, Control loop performance, Leak detection, Adsorbent Health Report, Lifting Alert.

Tail gas stream information may include, for example, Average pressure vs design, Peak to peak pressure swing.

Feed stream information may include, for example, Pressure vs Design, Flow rate vs design, Temperature vs design, Knockout Drum Level.

Returning to FIG. 7A, in some aspects, data displayed by the dashboard may be refreshed in real time, according to a preset schedule (e.g., every five seconds, every ten seconds, every minute), and/or in response to a refresh request received from a user.

The data collected by the system may provide real time and/or historical information regarding events, operations, and/or data. This information can be modelled to predict and/or anticipate future issues. This can be used to call for proactive maintenance actions and/or make corrective actions to the operation of the process unit to have an uninterrupted service.

The dashboard may include a button or option that allows a user to send data to one or more other devices. For example, the user may be able to send data via email, SMS, text message, iMessage, FTP, cloud sharing, AirDrop, or some other method. The user may be able to select one or more pieces of data, graphics, charts, graphs, elements of the display, or the like to share or send.

In some embodiments, a graphical user interface of an application may be used for providing alerts and/or receiving or generating commands for taking corrective action related to PSA, in accordance with one or more embodiments described herein. The graphical user interface may include an alert or alarm summary with information about a current state of a piece of equipment (e.g., a valve), a problem being experienced by a piece of equipment (e.g., a valve), a problem with a plant, or the like. For example, the graphical user interface may include an alert that a valve is experiencing a particular issue, a particular problem has been detected, or another alert.

A PSA alarm summary 720 may allow include an alarm log, which may enable troubleshooting PSA specific alarms.

An alarm health section 722 may create a decision tree based on one or more selected alarms from the alarm summary section 720. The decision tree may provide guided troubleshooting analysis leveraging embedded expertise.

The graphical user interface may include one or more buttons that, when pressed, cause one or more actions to be taken. For example, the graphical user interface may include a button that, when pressed, causes an operating characteristic (e.g., of a valve, of a plant, or the like) to change. For example, the computer may send a signal that opens or closes one or more valves or adjusts one or more flow controllers in response to a particular condition being detected. In another example, the graphical user interface may include a button that, when pressed, sends an alert to a contact, the alert including information similar to the information included in the alert provided via the graphical user interface. For example, an alert may be sent to one or more devices, and one or more users of those devices may cause those devices to send alerts, further information, and/or instructions to one or more other devices. In a further example, the graphical user interface may include a button that, when pressed, shows one or more other actions that may be taken (e.g., additional corrective actions, adjustments to operating conditions).

Several levels of alerts may be utilized. One level of alerts may be for alerts that require emergency action (e.g., Level 1). Another level of alerts may be for alerts that require action, but not immediate action (e.g., Level 2). Another level of alerts may be for alerts that are not related to the PSA unit (e.g., Level 3). A number of illustrative alerts are described below. These alerts are merely illustrative, and the disclosure is not limited to these alerts. Instead, these are merely examples of some of the types of alerts that may be related to, e.g., a PSA unit. As exemplified below, the alerts may identify the problem or issue and/or what corrective action (if any) may or should be taken.

An alert may include an indication of the alert level (e.g., level 1, level 2, level 3). The alert may include a name or identifier of the alert. The name or descriptive identifier of the alert may include a description of the determined problem that the alert is based on. The alert may include information on the determined problem. The alert may include information about potential causes of the determined problem. The alert may include a recommended further action (e.g., investigate and contact service representative). The alert may include information about who has received the alert. The alert may include an error code and/or error description for the error. The alert may include potential consequences of the error. The alert may include suggested actions for resolving the error.

Level 1 Alert Valve Not Operating

The system has detected a major concern relating to valve #17. Please investigate and contact service representative. A copy of this alert has been sent to your service representative. Error: Valve not operating.

Level 2 Alert Valve Inefficiency

The system has detected a concern relating to the valve #19. Please investigate and take corrective actions. A copy of this alert has been sent to your service representative. Error: Valve inefficiency. Suggested Actions: Investigate potential causes, and continue operation. May require valve replacement.

CONCLUSION

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system comprising:
   one or more sensors configured to measure operating information for a PSA unit;
   a data collection platform comprising:
      one or more processors of the data collection platform;
      a communication interface in communication with the one or more sensors; and
      memory storing executable instructions that, when executed, cause the data collection platform to:
         receive sensor data from the one or more sensors;
         correlate the sensor data with metadata comprising time data; and
         transmit the sensor data;
   a data analysis platform comprising:
      one or more processors of the data analysis platform; and
      memory storing executable instructions that, when executed, cause the data analysis platform to:
         receive the sensor data from the data collection platform;
         analyze the sensor data;
         transmit the sensor data and calculations to a dashboard;
         based on the analyzed sensor data, send a command for an adjustment to an operating condition related to the PSA unit;
         based on the sensor data from the one or more sensors, predict a remaining life of a valve of the PSA unit; and
         based on the predicted remaining life of the valve of the PSA unit, generate a recommendation for a maintenance to be performed on the valve of the PSA unit; and
   a control platform comprising:
      one or more processors of the control platform; and
      memory storing executable instructions that, when executed, cause the control platform to:
         receive the command for the adjustment to the operating condition related to the PSA unit; and
         adjust an element of the PSA unit based on the command for the adjustment to the operating condition.

2. The system of claim 1, wherein the memory of the data analysis platform stores instructions that, when executed, cause the data analysis platform to:
   based on the sensor data from the one or more sensors, identify a change in an operating condition of a valve of the PSA unit relative to a same operating condition of a different valve of the PSA unit; and
   send a command to change an operating parameter of the valve of the PSA unit.

3. The system of claim 1, wherein the memory of the data analysis platform stores instructions that, when executed, cause the data analysis platform to:
   based on the sensor data from the one or more sensors, identify a step change in an operating condition of a valve of the PSA unit relative to a historical operating condition of the valve of the PSA unit; and
   send a command to change an operating parameter of the valve of the PSA unit.

4. The system of claim 1, wherein the memory of the data analysis platform stores instructions that, when executed, cause the data analysis platform to:
   perform heuristic analysis on the sensor data from the one or more sensors to determine a recommendation for a maintenance to be performed on the PSA unit.

5. The system of claim 1, wherein the memory of the data analysis platform stores instructions that, when executed, cause the data analysis platform to:
  use the sensor data from the one or more sensors to predict an upcoming maintenance requirement for the PSA unit.

6. The system of claim 1, wherein the memory of the data analysis platform stores instructions that, when executed, cause the data analysis platform to:
  use the sensor data from the one or more sensors to monitor equipment health of the PSA unit.

7. One or more non-transitory computer-readable media storing instructions that, when executed by one or more processors, cause a system to:
  receive sensor data from one or more sensors configured to measure operating information for a PSA unit;
  correlate the sensor data with metadata comprising time data;
  analyze the sensor data;
  transmit the sensor data and calculations to a dashboard;
  based on the analyzed sensor data, send a command for an adjustment to an operating condition related to the PSA unit;
  based on the sensor data from the one or more sensors, predict a remaining life of a valve of the PSA unit; and
  based on the predicted remaining life of the valve of the PSA unit, generate a recommendation for a maintenance to be performed on the valve of the PSA unit.

8. The one or more non-transitory computer-readable media of claim 7, wherein the instructions, when executed, cause the system to:
  based on the sensor data from the one or more sensors, identify a change in an operating condition of a valve of the PSA unit relative to a same operating condition of a different valve of the PSA unit; and
  send a command to change an operating parameter of the valve of the PSA unit.

9. The one or more non-transitory computer-readable media of claim 7, wherein the instructions, when executed, cause the system to:
  based on the sensor data from the one or more sensors, identify a step change in an operating condition of a valve of the PSA unit relative to a historical operating condition of the valve of the PSA unit; and
  send a command to change an operating parameter of the valve of the PSA unit.

10. The one or more non-transitory computer-readable media of claim 7, wherein the instructions, when executed, cause the system to:
  perform heuristic analysis on the sensor data from the one or more sensors to determine a recommendation for a maintenance to be performed on the PSA unit.

11. The one or more non-transitory computer-readable media of claim 7, wherein the instructions, when executed, cause the system to:
  use the sensor data from the one or more sensors to predict an upcoming maintenance requirement for the PSA unit.

12. The one or more non-transitory computer-readable media of claim 7, wherein the instructions, when executed, cause the system to:
  use the sensor data from the one or more sensors to monitor equipment health of the PSA unit.

13. A method comprising:
  receiving, by a data analysis computing device, sensor data for a sensor associated with a PSA unit;
  based on analyzing the sensor data, determining a current operating condition for an element of the PSA unit;
  determining a difference between the current operating condition for the element of the PSA unit and an optimal operating condition for the element of the PSA unit;
  displaying the difference between the current operating condition and the optimal operating condition on a dashboard outlining recommendations for adjustments to the element of the PSA unit;
  based on the analyzed sensor data, determining a command for adjusting the element of the PSA unit to reduce the difference between the current operating condition and the optimal operating condition;
  sending the command for adjusting the element of the PSA unit;
  based on the sensor data from the one or more sensors, predict a remaining life of a valve of the PSA unit; and
  based on the predicted remaining life of the valve of the PSA unit, generate a recommendation for a maintenance to be performed on the valve of the PSA unit.

14. The method of claim 13, comprising:
  based on the sensor data from the sensor associated with the PSA unit, identifying a change in an operating condition of a valve of the PSA unit relative to a same operating condition of a different valve of the PSA unit; and
  sending a command to change an operating parameter of the valve of the PSA unit.

15. The method of claim 13, comprising:
  based on the sensor data from the sensor associated with the PSA unit, identifying a step change in an operating condition of a valve of the PSA unit relative to a historical operating condition of the valve of the PSA unit; and
  sending a command to change an operating parameter of the valve of the PSA unit.

16. The method of claim 13, comprising:
  performing heuristic analysis on the sensor data from the sensor associated with the PSA unit to determine a recommendation for a maintenance to be performed on the PSA unit.

17. The method of claim 13, comprising:
  using the sensor data from the sensor associated with the PSA unit to monitor equipment health of the PSA unit.

* * * * *